United States Patent
Wong et al.

(10) Patent No.: US 12,545,941 B2
(45) Date of Patent: Feb. 10, 2026

(54) MGAT1 DEFICIENT CELLS AND USES THEREOF

(71) Applicant: Rock BioMedical Inc., Taipei (TW)

(72) Inventors: Chi-Huey Wong, Rancho Santa Fe, CA (US); Lan-Bo Chen, Woburn, MA (US); Ming-Wei Chen, Woburn, MA (US); Jeng-Shin Lee, Taipei (TW)

(73) Assignee: ROCK BIOMEDICAL, INC., Taipei (TW)

( * ) Notice: Subject to any disclaimer, the term of this patent is extended or adjusted under 35 U.S.C. 154(b) by 0 days.

(21) Appl. No.: 18/665,736

(22) Filed: May 16, 2024

(65) Prior Publication Data

US 2024/0384320 A1    Nov. 21, 2024

Related U.S. Application Data

(60) Provisional application No. 63/502,866, filed on May 17, 2023.

(51) Int. Cl.
| | |
|---|---|
| *C12P 21/00* | (2006.01) |
| *C12N 9/22* | (2006.01) |
| *C12N 15/11* | (2006.01) |
| *C12N 15/90* | (2006.01) |

(52) U.S. Cl.
CPC .............. *C12P 21/005* (2013.01); *C12N 9/22* (2013.01); *C12N 15/11* (2013.01); *C12N 15/907* (2013.01); *C12Y 204/01101* (2013.01); *C12N 2310/20* (2017.05)

(58) Field of Classification Search
CPC ......... C12P 21/005; C12N 9/22; C12N 15/11; C12N 15/907; C12N 2310/20; C12Y 204/01101
See application file for complete search history.

(56) References Cited

U.S. PATENT DOCUMENTS

| | | | |
|---|---|---|---|
| 7,871,626 B2 | 1/2011 | Hoffmann et al. | |
| 8,187,838 B2 | 5/2012 | Tsukamoto et al. | |
| 10,301,377 B2 | 5/2019 | Graham et al. | |
| 10,906,944 B2 | 2/2021 | He et al. | |
| 10,953,089 B1 | 3/2021 | Smith et al. | |
| 10,954,289 B1 | 3/2021 | Babb et al. | |

(Continued)

FOREIGN PATENT DOCUMENTS

| | | |
|---|---|---|
| CN | 105934441 A | 9/2016 |
| CN | 111892648 A | 11/2020 |

(Continued)

OTHER PUBLICATIONS

Byrne et al. (2018) "CRISPR/Cas9 gene editing for the creation of an MGAT1-deficient CHO cell line to control HIV-1 vaccine glycosylation." PLOS Biology 16(8): e2005817 (Year: 2018).*

(Continued)

*Primary Examiner* — Brian Whiteman
*Assistant Examiner* — Amanda M Zahorik
(74) *Attorney, Agent, or Firm* — Prosyla Group, PC

(57) ABSTRACT

A method for producing a modified cell deficient in mannosyl (alpha-1,3-)-glycoprotein beta-1,2-N-acetylglucosaminyltransferase 1 ("MGAT1") activity. Also provided is a CHO cell line deficient in MGAT1 activity produced by the method. Further disclosed are methods for producing a glycoprotein.

10 Claims, 12 Drawing Sheets

Figure 1:
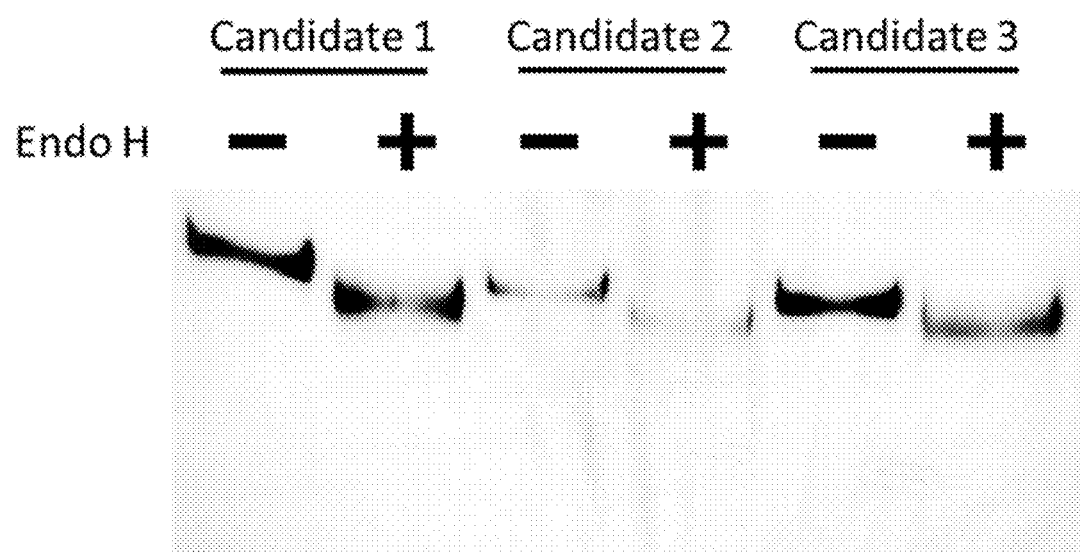

Specification includes a Sequence Listing.

(56) References Cited

U.S. PATENT DOCUMENTS

| | | |
|---|---|---|
| 11,480,391 B2 | 10/2022 | Wong et al. |
| 11,866,485 B2 | 1/2024 | Lin et al. |
| 11,918,641 B2 | 3/2024 | Wong et al. |
| 11,992,525 B2 | 5/2024 | Wong et al. |
| 12,085,340 B2 | 9/2024 | Wong et al. |
| 12,157,763 B2 | 12/2024 | Lin et al. |
| 12,257,298 B2 | 3/2025 | Ma et al. |
| 12,318,485 B2 | 6/2025 | Wong et al. |
| 2006/0073542 A1 | 4/2006 | Bayer et al. |
| 2010/0041740 A1 | 2/2010 | Wong et al. |
| 2010/0247571 A1 | 9/2010 | Wong et al. |
| 2013/0309176 A1 | 11/2013 | Port et al. |
| 2014/0107049 A1 | 4/2014 | Bennani et al. |
| 2015/0132330 A1 | 5/2015 | Garcia-Sastre et al. |
| 2016/0199481 A1 | 7/2016 | Bloom |
| 2016/0376321 A1 | 12/2016 | Hotez et al. |
| 2018/0043007 A1 | 2/2018 | LeFebvre et al. |
| 2019/0388460 A1 | 12/2019 | Hedrick et al. |
| 2020/0046826 A1 | 2/2020 | Wong et al. |
| 2020/0078452 A1 | 3/2020 | Wong et al. |
| 2020/0079808 A1 | 3/2020 | Pfister et al. |
| 2020/0231633 A1 | 7/2020 | Berman et al. |
| 2020/0283743 A1 | 9/2020 | Zhang et al. |
| 2021/0017563 A1 | 1/2021 | Bhatnagar et al. |
| 2021/0207106 A1 | 7/2021 | Anthony et al. |
| 2021/0316002 A1 | 10/2021 | Ellis |
| 2021/0386852 A1 | 12/2021 | Duprex |
| 2022/0233713 A1 | 7/2022 | Callan et al. |
| 2023/0074185 A1 | 3/2023 | Wong et al. |
| 2023/0105209 A1 | 4/2023 | Lin et al. |
| 2023/0279080 A1 | 9/2023 | Lin et al. |
| 2023/0302114 A1 | 9/2023 | Wong |
| 2024/0016917 A1 | 1/2024 | Ma et al. |
| 2024/0066113 A1 | 2/2024 | Wong et al. |
| 2024/0100147 A1 | 3/2024 | Wong et al. |
| 2024/0228591 A1 | 7/2024 | Lin et al. |
| 2024/0366516 A1 | 11/2024 | Wong et al. |
| 2024/0366517 A1 | 11/2024 | Wong et al. |
| 2024/0384320 A1 | 11/2024 | Wong et al. |
| 2025/0041222 A1 | 2/2025 | Wong et al. |
| 2025/0114446 A1 | 4/2025 | Wu et al. |

FOREIGN PATENT DOCUMENTS

| | | |
|---|---|---|
| CN | 112626124 A | 4/2021 |
| CN | 113388011 A | 9/2021 |
| CN | 116478948 A | 7/2023 |
| EP | 1987068 A1 | 11/2008 |
| EP | 2949665 A1 | 12/2015 |
| JP | 2012530499 A | 12/2012 |
| JP | 2017518989 A | 7/2017 |
| RU | 2720614 C1 | 5/2020 |
| RU | 2730897 C1 | 8/2020 |
| WO | 2004099240 A2 | 11/2004 |
| WO | 2004099240 A3 | 11/2004 |
| WO | 2007008918 A2 | 1/2007 |
| WO | 2007095506 A1 | 8/2007 |
| WO | 2009002516 A1 | 12/2008 |
| WO | 2009007427 A2 | 1/2009 |
| WO | 2010022737 A1 | 3/2010 |
| WO | 2010111687 A2 | 9/2010 |
| WO | 2010148511 A1 | 12/2010 |
| WO | 2011115862 A1 | 9/2011 |
| WO | 2012054907 A2 | 4/2012 |
| WO | 2012088428 A1 | 6/2012 |
| WO | 2013043729 A1 | 3/2013 |
| WO | 2013067652 A1 | 5/2013 |
| WO | 2014115797 A1 | 7/2014 |
| WO | 2015057942 A1 | 4/2015 |
| WO | 2015073727 A1 | 5/2015 |
| WO | 2015176662 A1 | 11/2015 |
| WO | 2015184004 A1 | 12/2015 |
| WO | 2017062496 A2 | 4/2017 |
| WO | 2017081082 A2 | 5/2017 |
| WO | 2018089407 A1 | 5/2018 |
| WO | 2019028190 A1 | 2/2019 |
| WO | 2015028478 A1 | 6/2019 |
| WO | 2019246363 A1 | 12/2019 |
| WO | 2020011275 A1 | 1/2020 |
| WO | 2020058239 A1 | 3/2020 |
| WO | 2019246363 | 4/2020 |
| WO | 2020172072 A1 | 8/2020 |
| WO | 2020198865 A1 | 10/2020 |
| WO | 2020205034 A1 | 10/2020 |
| WO | 2021019102 A2 | 2/2021 |
| WO | 2021035325 A1 | 3/2021 |
| WO | 2021045632 A1 | 3/2021 |
| WO | 2021045836 A1 | 3/2021 |
| WO | 2021174128 A1 | 9/2021 |
| WO | 2021180602 A1 | 9/2021 |
| WO | 2021183195 A1 | 9/2021 |
| WO | 2021186028 A1 | 9/2021 |
| WO | 2021214204 A1 | 10/2021 |
| WO | 2021219897 A1 | 11/2021 |
| WO | 2021226533 A1 | 11/2021 |
| WO | 2021233989 A1 | 11/2021 |
| WO | 2021257586 A1 | 12/2021 |
| WO | 2022047401 A1 | 3/2022 |
| WO | 2022221835 A2 | 10/2022 |
| WO | 2022221837 A2 | 10/2022 |
| WO | 2022227927 A1 | 11/2022 |
| WO | 2022229854 A1 | 11/2022 |
| WO | 2022231980 A1 | 11/2022 |
| WO | PCTUS2282428 | 12/2022 |
| WO | 2023021111 A1 | 2/2023 |
| WO | 2023056482 A1 | 4/2023 |
| WO | 2023069551 A1 | 4/2023 |
| WO | 2023129928 A2 | 7/2023 |
| WO | 2024215612 A2 | 10/2024 |
| WO | 2024215614 A2 | 10/2024 |
| WO | 2024215616 A2 | 10/2024 |

OTHER PUBLICATIONS

GenBank Accession No. NC_048600.1 (Cricetulus griseus strain 17A/GY chromosome 7, alternate assembly CriGri-PICRH-1.0, whole genome shotgun sequence. Jul. 12, 2020) (Year: 2020).*

Shin et al. "CRISPR/Cas9 targeting events cause complex deletions and insertions at 17 sites in the mouse genome". Nature Communications vol. 8, Article No. 15464 (2017) (Year: 2017).*

Huang et al. "Vaccination with SARS-CoV-2 spike protein lacking glycan shields elicits enhanced protective responses in animal models". Sci Transl Med. Apr. 6, 2022; 14(639):eabm0899 (Year: 2022).*

NCBI GenBank Accession No. QHD43416.1 (surface glycoprotein [Severe acute respiratory syndrome coronavirus 2]; Published Mar. 18, 2020 (Year: 2020).*

Janeway Jr., Charles A et al., "Immunobiology: The Immune System in Health and Disease," 3rd edition, Garland Publishing Inc., 1997, pp. 3:1-3:11.

Kanyavuz, Alexia et al., "Breaking the law: unconventional strategies for antibody diversification," Nat Rev Immunol., Jun. 2019, 19(6):355-368. doi: 10.1038/S41577-019-0126-7. PMID: 30718829.

Krammer, Florian et al., "Chimeric Hemagglutinin Influenza Virus Vaccine Constructs Elicit Broadly Protective Stalk-Specific Antibodies," Journal of Virology, Jun. 2013, vol. 87, No. 12, pp. 6542-6550.

Kurzawa, Timon, "1,1,2,2,3,3,4,4,4-Nonafluorobutane-1-sulfonyl fluoride (NfF)," Synlett, 2015, vol. 26, pp. 1422-1423.

Lescar et al., "Crystal Structure of a Cross-reaction Complex between Fab F9.13.7 and Guinea Fowl Lysozyme," J Biol Chem., Jul. 1995, 270(30):18067-76. doi: 10.1074/jbc.270.30.18067. PMID: 7629116.

Levit, Mariia et al., "Bio-Inspired Amphiphilic Block-Copolymers Based on Synthetic Glycopolymer and Poly(Amino Acid) as Potential Drug Delivery Systems," Polymers, 2020, vol. 12, pp. 183 (27 pages). doi:10.3390/polym12010183.

Li, et al., Glycosylation of Neuraminidase Determines the Neurovirulence of Influenza A/WSN/33 Virus, 1993, Journal of Virology, vol. 67, No. 11, pp. 6667-6673.

(56) References Cited

OTHER PUBLICATIONS

Liu, Wen-Chun et al., "Unmasking Stem-Specific Neutralizing Epitopes by Abolishing N-Linked Glycosylation Sites of Influenza Virus Hemagglutinin Proteins for Vaccine Design", Journal of Virology, vol. 90 No. 19, Oct. 2016.
Lloyd, C. et al., "Modelling the human immune response: performance of a 10(11) human antibody repertoire against a broad panel of therapeutically relevant antigens," Protein Engineering Design & Selection, 2009, vol. 22, No. 3, pp. 159-168. doi: 10.1093/protein/gzn058.
Lo, H.-J. et al., "Synthesis of Sialidase-Resistant Oligosaccharide and Antibody Glycoform Containing α2,6-Linked 3Fax-Neu5Ac", J. Am. Chem. Soc., Apr. 10, 2019, vol. 141, No. 16, pp. 6484-6488. (Whole Document. ).
Lostalé-Seijo, Irene and Montenegro, Javier, "Synthetic materials at the forefront of gene delivery," Nature Reviews Chemistry, vol. 2, Sep. 21, 2018, pp. 258-277.
Ma et al., "The Role of Glucose Transporters in the Distribution of p-aminophenyl mannppyranose modified liposomes within mice brains," Journal of Controlled Release, 182, pp. 99-110. (Year: 2014).
Magazine, Nicholas et al., "Mutations and Evolution of the SARS-CoV-2 Spike Protein," Viruses, 2022, vol. 14, 640, 11 pgs.
Medina, Rafael A. et al., "Glycosylations in the globular head of the hemagglutinin protein modulate the virulence and antigenic properties of the H1N1 influenza viruses", Sci Transl Med., May 29, 2013.
Nobusawa et al., "Comparison of Complete Amino Acid Sequences and Receptor-Binding Properties among 13 Serotypes of Hemagglutinins of Influenza A Viruses", Virology, 182, 475-485 (1991).
Non-Final Office Action issued in U.S. Appl. No. 17/937,744 dated Jul. 5, 2023.
Office Action and Search Report issued in Taiwan Patent Application No. 111113933 on Mar. 26, 2024. English translation of search report.
Office Action issued in Taiwan Patent Application No. 111113932 on Oct. 16, 2023.
Office Action issued on Nov. 14, 2022, in Israel Patent Application No. 293502.
Official Action, dated Aug. 31, 2023, received in Russia Patent Application No. 2023100504. English translation provided.
Okamoto, K. et al., "An effective synthesis of α-glycosides of N-acetylneuraminic acid by use of 2β-halo-3β-hydroxy-4, 7,8,9-tetra-O-acetyl-N-acetylneuraminic acid methyl ester", Tetrahedron Letters, 1986, vol. 27, No. 43, pp. 5233-5236.
Pappalardo, Juan Sebastian et al., "Characterization of a Nanovaccine Platform Based on an [alpha]1,2-Mannobiose Derivative Shows Species-non-specific Targeting to Human, Bovine, Mouse, and Teleost Fish Dendritic Cells," Molecular Pharmaceutics, 2021, vol. 18, 2540-2555.
Rahman, M Shaminur et al., "Epitope-based chimeric peptide vaccine design against S, M, and E proteins of SARS-CoV-2, the etiologic agent of COVID-19 pandemic, an in silico approach", PeerJ, Jul. 27, 2020 (publication date), DOI 10.7717/peerj.9572, Internal pp. 1-30, Supplemental Information pp. 1, 2. Abstract; and supplemental information pp. 1, 2.
Rees-Spear, Chloe et al., "The effect of spike mutations on SARS-CoV-2 neutralization," Cell Rep., Mar. 2023, 34 (12): 108890. Published online Mar. 6, 2021. doi: 10.1016/j.celrep.2021.108890: 10.1016/j.celrep.2021.108890 PMCID: PMC7936541 PMID: 33713594.
Roberts, Paul C. et al., "Role of Conserved Glycosylation Sites in Maturation and Transport of Influenza A Virus Hemagglutinin", Journal of Virology, Jun. 1993, p. 3048-3060.
Rudikoff et al., "Single amino acid substitution altering antigen-binding specificity," Proc. Natl Acad Sci U S A, Mar. 1982, vol. 79(6), pp. 1979-1983. doi: 10.1073/pnas.79.6.1979. PC/D: 6804947.
Sanda, Miloslav et al., "N- and O-Glycosylation of the SARS-CoV-2 Spike Protein," Anal. Chem., vol. 93, No. 4, Jan. 7, 2021, pp. 2003-2009.
Search Report, dated Aug. 31, 2023, received in Russia Patent Application No. 2023100504.
Shivatare, Vidya et al., "Study on antibody Pc-glycosylation for optimal effector functions," Chem Commun (Camb), 2024, vol. 59, iss. 37, pp. 5555-5558. doi: 10.1039/d3cc00672g.
Sun et al., "N-Linked Glycosylation of the Hemagglutinin Protein Influences Virulence and Antigenicity of the 1918 Pandemic and Seasonal H1N1 Influenza A Viruses", 2013, Journal of Virology, vol. 87, No. 15, pp. 8756-8766.
Tai, Wanbo et al., "Characterization of the receptor-binding domain (RBD) of 2019 novel coronavirus: implication for development of RBD protein as a viral attachment inhibitor and vaccine," Cell Mol Immunol. Jun. 2020;17(6):613-620 https://pubmed.ncbi.nlm.nih.gov/32203189/.
Tian, Jing-Hui et al., "SARS-CoV-2 spike glycoprotein vaccine candidate NVX-CoV2373 immunogenicity in baboons and protection in mice," Nature Communications, 2021, 14 pages. Downloaded Sep. 27, 2023: https://doi. org/10.1038/s41467-020-20653-8.
Torres-Vanegas, Julian D., "Delivery Systems for Nucleic Acids and Proteins: Barriers, Cell Capture Pathways and Nanocarriers," Pharmaceutics, vol. 13, No. 3, Mar. 22, 2021, pp. 428.
Vogel, Annette B. et al. "BNT162b vaccines protect rhesus macaques from SARS-CoV-2," Nature, vol. 592, Feb. 1, 2021, pp. 283-289.
Wang, Ce et al., "Lymphatic-targeted cationic liposomes: A robust vaccine adjuvant for promoting long-term immunological memory," Vaccine, 2014, vol. 32, 5475-5483.
Wang, Ce et al., Supplementary Data, 2014, Vaccine, 32, 5475-5483.
Wang, Qiong et al., "Antibody glycoengineering strategies in mammalian cells," Biotechnology and Bioengineering, 2018, vol. 115:1378-1393.
Wang, Shih-Chi et al., "Development of a universal influenza vaccine using hemagglutinin stem protein produced from Pichia pastoris," Virology, 2019, vol. 526, pp. 125-137.
Watanabe, Yasunori et al., "Exploitation of glycosylation in enveloped virus pathobiology," BBA—General Subjects 1863, 2019), pp. 1480-1497.
Watanabe, Yasunori et al., "Site-specific glycan analysis of the SARS-CoV-2 spike," Science, Jul. 2020, vol. 369, pp. 330-333.
Weissman, Drew et al., "D614G Spike Mutation Increases Sars CoV-2 Susceptibility to Neutralization," Cell Host & Microbe, Jan. 13, 2021, vol. 29, pp. 23-31 (e1-e4).
Wu, Chung-Yi et al., "Glycosite-deleted mRNA of SARS-CoV-2 spike protein as a broad-spectrum vaccine," PNAS, 2022, vol. 119, No. 9. https://doi.irg/10.1073/pnas.2119995119.
Wu, Chung-Yi et al., "Influenza A surface glycosylation and vaccine design", PNAS, Jan. 2017, (Epub Dec. 27, 2016), vol. 114, No. 2, pp. 280-285.
Yang et al., "Glucoproteomic Characterization of FUT8 Knock-Out Cells Reveals Roles of FUT8 in the Glycosylation," Frontiers in Chemistry, Oct. 28, 2021, vol. 9, No. 755238, pp. 1-9, entire document.
Yang, Zhiwei et al., "Mutation effects of neuraminidases and their docking with ligands: a molecular dynamics and free energy calculation study", J Comput Aided Mol Des, 27: 935-950, 2013.
Zaraket, Hassan et al., "Full Genome Characterization of Human Influenza A/H3N2 Isolates from Asian Countries Reveals a Rare Amantadine Resistance-Conferring Mutation and Novel PB1-F2 Polymorphisms", Frontiers in Microbiology, vol. 7, Article 262, Mar. 2016.
Zhang, Penghui et al., "Engineering the Surface of Smart Nanocarriers Using a pH- /Thermal- /GSH-Responsive Polymer Zipper for Precise Tumor Targeting Therapy in Vivo," Advanced Materials, 2017, vol. 29, 1702311 (10 pages).
Zhang, Ruhe et al., "Poly(disulfide)s: From Synthesis to Drug Delivery," Bio Macromolecules, 2022, vol. 23, pp. 1-19.
Zhang, Xiaojian et al., "Role of stem glycans attached haemagglutinin in the biological characteristics of H5N1 avian influenza virus", Journal of General Virology, 96, 1248-1257, 2015.
Zhang, Yan et al., "Glycosylation on Hemagglutinin Affects the Virulence and Pathogenicity of Pandemic H1N1/2009 Influenza A Virus in Mice", PLOS One, vol. 8, Issue 4, Apr. 2013.

(56) References Cited

OTHER PUBLICATIONS

Alam, MM et al., "Glycan-Modified Virus-Like Particles Evoke T Helper Type 1-Like Immune Responses," ACS Nano, vol. 15, No. 1, Jan. 26, 2021, published online Aug. 17, 2020, doi: 10.1021/acsnano.0c03023, pp. 309-321; (p. 19, figure 1b).

Avinash, MB et al., "Nanoarchitectonics of biomolecular assemblies for functional applications," Nanoscale, vol. 6, No. 22, Nov. 21, 2014, doi: 10.1039/c4nr04340e, pp. 13348-13369. (p. 18, figure 13c).

Bang, Eun-Kyoung et al., JACS, 2013, vol. 135, pp. 2088-2091. dx.doi.org/10.1021/ja311961k.

Bej, Raju et al., "Disulfide chemistry in responsive aggregation of amphiphilic systems," Royal Society of Chemistry, 2020, vol. 16, pp. 11-26. DOI: 10.1039/C9SM01960J.

Bellato, Frederica, "Targeting dendritic cells with mannosylated cationic glycopolymers for nucleic acid-mediated cancer immunotherapy," UNITesi, Magazzini Digitali, 2019, 25 pages. (https://tesidottorato.depositolegale.it/handle/20.500.14242/98191).

Bennua-Skalmowski, B. et al., "A Facile Conversion of Primary or Secondary Alcohols with n-Perfluorobutane-sulfonyl Fluoride/1,8-Diazabicyclo[5.4.0]undec-7-ene into their Corresponding Fleorides," Tetrahedron Letters, vol. 36, No. 15, pp. 2611-2614, 1995.

Bernstein, David et al., "Immunogenicity of chimeric haemagglutinin-based, universal influenza virus vaccine candidates: interim results of a randomized, placebo-controlled, phase 1 clinical trial", The Lancet Infectious Disease, Elsevier, Amerstdam, NL, vol. 20, No. 1, Oct. 17, 2019, pp. 80-91, XP085982810. ISSN: 1473-3099, DOI: 10.1016/S1473-3099(19)30393-7.

Bosch, Berend Jan et al., "Coronavirus Escape from Heptad Repeat 2 (HR2)-Derived Peptide Entry Inhibition as a Result of Mutations in the HR1 Domain of the Spike Fusion Protein," J of Virol., Mar. 2008, vol. 82, No. 5, pp. 2580-2585.

Cao, Yiwei et al., "Dynamic Interactions of Fully Glycosylated SARS-CoV-2 Spike Protein with Various Antibodies," JCTC, Sep. 16, 2021, vol. 17, pp. 6559-6569.

Castrucci, M.R. et al., "Biologic importance of neuramindase stalk length in influenza A virus", Journal of Virology, 1993, vol. 67, No. 2, pp. 759-764.

Chokhawala, H.A. et al., "Enzymatic Synthesis of Fluorinated Mechanistic Proves for Sialidases and Sialyltransferases", J.Am. Chem. Soc., 2007, p. 10630; scheme 1.

Chokhawala, Harshai A. et al., "Enzymatic Synthesis of Fluorinated Mechanistic Probes for Sialidases and Sialytransferases," JACS Communications, 2007, vol. 129, pp. 10630-10631.

Chuard, Nicolas et al., "Cell-penetrating poly(disulfide)s: the dependence of activity, depolymerization kinetics and intracellular localization on their length," Organic & Biomolecular Chemistry, 2015, vol. 13, pp. 64-67.

Dang, Juanjuan et al., "Multivalency-assisted membrane-penetrating siRNA delivery sensitizes photothermal ablation via inhibition of tumor glycolysis metabolism," Biomaterials, vol. 223, Dec. 2019, 119463.

Davies, Nicholas G. et al., "Estimated transmissibility and impact of SARS-CoV-2 lineage B.1.1.7 in England," Science, Apr. 2021, vol. 372, pp. 149 (10 pages).

Definition of hemagglutinin [Influenza A virus (A/chicken/Jembrana/BPPV6/2004(H5N1))]. GenBank: ABE97562.1. https://www.ncbi.nlm.nih.gov/protein/ABE97562.1?report=genbank&log$=prottop&blast_rank=1&RID=CGUK0N57013.

Definition of hemagglutinin [Influenza A virus (A/Singapore/GP4444/2010(H1N1))]. GenBank: AEH59357.1. https://www.ncbi.nlm.nih.gov/protein/AEH59357.1?report=genbank&log$=prottop&blast_rank=1&RID=CGTA0JCD016.

Ding, Li et al., "A *Photobacterium* sp. [alpha]2-6-sialyltransferase (Psp2,6ST) mutant with an increased expression level and improved activities in sialylating Tn antigens," Carbohydrate Research, 2014, vol. 408, 127-133 (7 pages).

Doboszewski, Bogdan et al., "The rapid synthesis of deoxyfluoro sugars using tris(dimethylamino)sulfonium difluorotrimethylsilicate (TASF)1," 1987, Canadian Journal of Chemistry, 65(2): 412-419.

Dowling, W. et al., "Influences of Glycosylation on Antigenicity, Immunogenicity, and Protective Efficacy of Ebola Virus GP DNA Vaccines", J. of Virology, 2007, vol. 81, No. 4, pp. 1821-1837, p. 1822, second column, fourth paragraph; p. 1823, second column, third paragraph; doi:10.1128/JVI.02098-06.

Du, Dan et al., "The role of glucose transporters in the distribution of p-aminophenyl-[alpha]-D-mannopyranoside modified liposomes within mice brain," Journal of Controlled Released, 2014, vol. 182. pp. 99-110.

Edwards, et al., "The Remarkable Flexibility of the Human Antibody Repertoire; Isolation of Over One Thousand Different Antibodies to a Single Protein, BLyS," J. Mol. Biol., Nov. 2003, 14:334(1):103-18; doi: 10.1016/jmb.2003.09.054. PMID 14596803.

Engdahl, Cecilia et al., "Estrogen induces St6gal1 expression and increases IgG sialylation in mice and patients with rheumatoid arthritis: a potential explanation for the increased risk of rheumatoid arthritis in postmenopausal women," Arthritis Research & Therapy, 2018, vol. 20:84 (11 pages).

Fan, Cy et al., "Synthesis of Dendritic Cell-Targeted Polymeric Nanoparticles for Selective Delivery of mRNA Vaccines to Elicit Enhanced Immune Responses," bioRxiv, Epub: Nov. 14, 2023; pp. 1-12; entire document; DOI: 10.1101/2023.11.13.566827.

Feng et al., "A Glycolipid Adjuvant, 7DW8-5, Enhances the Protective Immune Response to the Current Slpit Influenza Vaccine in Mice", Frontiers in Microbiology, Sep. 18, 2019, vol. 10, No. 2157M, pp. 1-9; abstract.

Focosi, Daniele, "Neutralising antibody escape of SARS-CoV-2 spike protein: Risk assessment for antibody-based Covid-19 therapeutics and vaccines," Rev. Med Virol., 2021, vol. 31, 21 pages. e2231.

Galili, "Amplifying immunogenicity of prospective Covid-19 vaccines by glycoengineering the coronavirus glycan-shield to present alpha-gal epitopes", Vaccine, Aug. 19, 2020; abstract; Fig. 1; DOI: 10.1016/j.vaccine.2020.08032.

Galili, Uri, "Amplifying immunogenicity of prospective Covid-19 vaccines by glycoengineering the coronavirus glycan-shield to present [alpha]-gal epitopes," Vaccine, 2020, vol. 38, pp. 6487-6499.

Galili, Uri, "COVID-19 variants as moving targets and how to sop them by glycoengineered whole-virus vaccines," Virulence, 12:1, 1717-1720, DOI: 10.1080/21505594.2021.1939924. (https://doi.org/10.1080/21505594.2021.1939924).

Geisler, Christoph et al., "Engineering [beta]1,4-galactosyltransferase I to reduce secretion and enhance N-glycan elongation in insect cells," Journal of Biotechnology, 2015, vol. 193, 52-65 (14 pages).

GenBank Accession BCN86353.1 accessed on Jan. 22, 2021. https://www.ncbi.nlm.nih.gov/protein/BCN86353.1?report=genbank&log$=protalign&blast_rank=2&RID=EYKWWEAA016.

GenBank Accession CCH23214, haemagglutinin [Influenza A virus (A/WSN/1933(H1N1))], 2013.

GenBank accession MN908947.3, Mar. 18, 2020, 11 pages. (https://www.ncbi.nlm.nih.gov/nuccore/MN908947).

GenBank Accession, ACF54601, neuraminidase [Influenza A virus (A/WVSN/1933(H1N1))], 2008.

GenBank Accession: QHD43416.1, (Mar. 18, 2020) [Described in the Office Action as Appendix A] (Year: 2020).

GenBank: QLB39105.1 accessed on Jan. 1, 2020. https://www.ncbi.nlm.nih.gov/protein/QLB39105.1?report=genbank&log$=protalign&blast_rank=1&RID=EYKWWEAA016.

GenBank: QTA38985.1 accessed Mar. 21, 2021. https://www.ncbi.nlm.nih.gov/protein/QTA38985.1?report=genbank&log$=protalign&blast_rank=3&RID=EYKWWEAA016.

Gillian, M. Air, "Influenza neuraminidase", Influenza and Other Respiratory Viruses, 2011.

Goel, Manisha et al., "Plasticity within the Antigen-Combining Site May Manifest as Molecular Mimicry in the Humoral Immune Response," J. Immunol., Dec. 15, 2004, 173(12):7358-67 PMID: 15585860 DOI: 10.4049/jimmunol.173.12.7358.

(56) References Cited

OTHER PUBLICATIONS

Gong, Yanqiu et al., "The glycosylation in SARS-CoV-2 and its receptor ACE2," Signal Transduction and Targeted Therapy, 2021, vol. 6, 396 (24 pages).
Goswami, Roshan et al., "Conjugation of Mannans to Enhance the Potency of Liposome Nanoparticles for the Delivery of RNA Vaccines," Pharmaceutics, 2021, vol. 13, 240, 13 pages.
Grant, Oliver C. et al., "Analysis of the SARS-CoV-2 spike protein glycan shield reveals implications for immune recognition," Scientific Reports, 2020, vol. 10, 14991. https://doi.org/10.1038/s41598-020-71748-7.
Gutierrez Reyes, Cristian D., et al. "N-Glycome Profile of the Spike Protein S1: Systemic and Comparative Analysis from Eleven Variants of SARS-CoV-2," Biomolecules, 2023, vol. 13, pp. 1421 (17 pages).
Hayashi, T. et al., "Stereospecific α-Sialylation by SIte-Selective Fluorination", Agnew. Chem. Int. Ed., Jan. 25, 2019, vol. 58, pp. 3814-3818. (Whole Document).
He, P. et al., "Advances in aluminum hydroxide-based adjuvant research and its mechanism," Human Vaccine and Immunotherapeutics, 2015, vol. 11, iss. 2, pp. 477-488.
Hombu, Ryoma et al., "Cellular and Molecular Engineering of Glycan Sialylation in Heterologous Systems," Molecules, 2021, vol. 26, 5950 (27 [ages).
Huang et al., "Impact of glycosylation on SARS-CoV-2 infection and broadly protective vaccine design," BioRxiv, May 25, 2021, DOI: https://doi.org/10.1101/2021.05.25.445523, internal pp. 1-48.
Huang, Han-Yi et al., "Vaccination with SARS-CoV-2 spike protein lacking glycan shields elicits enhanced protective responses in animal models," Sci. Transl. Med., vol. 14, eabm0899, (2022), 13 pages.
Hughes et al., "Adaptation of Influenza A Viruses to Cells Expressing Low Levels of Sialic Acid Leads to Loss of Neuraminidase Activity", Journal of Virology, 2001, vol. 75, No. 8, pp. 3766-3770.
International Search Report and Written Opinion issued on Jun. 22, 2023 in International Patent Application No. PCT/US22/82428.
Zhang, Yong et al., "Site-specific N-glycosylation Characterization of Recombinant SARS-CoV-2 Spike Proteins," Mol Cell Proteomics, 2021, vol. 20, 100058. https://doi.org/10.1074/mcp.RA120.002295.
Zhao, "Glycans of SARS-CoV-2 Spike Protein in Virus Infection and Antibody Production", Frontiers in Molecular Biosciences, Apr. 13, 2021; Entire Document; DOI: 10.3389/fmolb.2021.629873.
Zheng, J. et al., "Identification of N-linked glycosylation sites in the spike protein and their functional impact on the replication and infectivity of coronavirus infectious bronchitis virus in cell culture", Virology, Oct. 13, 2017, vol. 513, pp. 65-74; abstract; p. 65, 1st column, second paragraph; p. 66, col. 5th paragraph; p. 68, first column, first, third paragraphs; Table 3; figure 5; http://dx.doi.org/10.1016/j.virol.2017.10.003.
Almaraz, Ruben T. et al., "Metabolic Oligosaccharide Engineering: Implications for Selectin-Mediated Adhesion and Leukocyte Extravasation," Ann Biomed Eng., Apr. 2012, vol. 40, Art. 4, pp. 806-815. doi: 10.1007/s10439-011-0450-y.
Casalino, Lorenzo et al., "Beyond Shielding: The ROles of Glycans in the SARS-CoV-2 Spike Protein," ACS Central Science, 2020, vol. 6, No. 10, pp. 1722-1734. http://pubs.acs.org/journal/acscii.
GenBank Accession No. MW560959.1 dated Mar. 21, 2021. www.ncbi.nlm.nih.gov/nucleotide/MW560959.1 (Year: 2021).
GenBank Accession No. UPO69279.1 dated Nov. 30, 2021. https://www.ncbi.nlm.nih.gov/protein/UFO69279.1 (Year: 2021).
GenBank Accession No. YP_009724390.1 dated Jul. 18, 2020. https://www.ncbi.nlm.nih.gov/protein/YP_009724390.1 (Year: 2020).
Huang, Yuan et al., "Structural and functional properties of SARS-CoV-2 spike protein: potential antivirus drug development for COVID-19," Acta Pharmacologica Sinica, (2020), 41:1141-1149; https://doi.org/10.1038/s41401-020-0485-4.
Uniprot, ID: B4GT-1_Human, P15291, available Oct. 17, 2006 (Year: 2006).
Wang, Mingqun et al., "Engineering a bacterial sialyltransferase for di-sialylation of a therapeutic antibody," Organic & Biomolecular Chemistry, 2020, vol. 18, 2886, 7 pages. DOI: 10.1039/d0ob00276c.
Zhou, Daming et al., "Structural basis for the neutralization of SARS-CoV-2 by antibody from convalescent patient," Nature Structural & Molecular Biology, Oct. 2020, vol. 27, pp. 950 (25 pages).
Cao, Yunlong et al., "Omicron escapes the majority of existing SARS-CoV-2 neutralizing antibodies," Nature, Dec. 23, 2021, vol. 602, No. 7898, pp. 657-663. XP037700795, DOI: 10.1038/S41586-021-04385-3.
Cheng, Cheng-Wei et al., "Low-sugar universal mRNA vaccine against coronavirus variants with deletion of glycosites in the S2 or stem of SARS-CoV-2 spike messenger RNA (mRNA)," PNAS, 2023, vol. 120, No. 49, 8 pages. doi: 10.1073/pnas.2314392120.
Sun, Da and Lu, Zheng-Rong, "Structure and Function of Cationic and lonizable Lipids for Nucleic Acid Delivery," Pharmaceutical Research, (2023), 40:27-46. https://doi.org/10.1007/s11095-022-03460-2.

* cited by examiner

MGAT1 DEFICIENT CELLS AND USES THEREOF

CROSS-REFERENCE TO RELATED APPLICATIONS

This application claims benefit to and priority of U.S. Provisional Patent Applications Nos. 63/502,866, filed on May 17, 2023. The entirety of the aforementioned application is incorporated herein by reference.

SEQUENCE LISTING

The instant application contains a Sequence Listing, which is submitted electronically in .xml format and is hereby incorporated by reference in its entirety. The xml copy, created on May 15, 2024, is named "A1000-01200US_20240515_SeqListing.xml" and is 20 kilobytes in size.

FIELD OF THE INVENTION

The present disclosure is directed to novel cell lines and methods of producing glycoproteins.

BACKGROUND

Developing broadly protective vaccines against pathogenic viruses remains a major challenge in immunology and public health. For example, a broadly protective vaccine is needed to address the continued emergence of new variants of SARS-COV2.

The SARS-COV2 spike protein, a key immunogen, is susceptible to mutation and includes conserved epitopes shielded by glycans. Recent studies have shown that spike protein glycosylation has site-differential effects on viral infectivity, and the spike proteins generated in lung epithelial cells upon infection carry glycoforms of higher infectivity. It has also been shown that immunization of mice with spike proteins having N-linked glycans trimmed to a monoglycosylated state elicits stronger immune responses and better protection against SARS-COV2 variants, as compared to immunization with fully glycosylated spike proteins.

One method to produce viral antigens with altered glycosylation is to mutate the O- or N-glycosylation sites of the antigens. Yet, doing so alters the protein structure and can result in loss of epitopes and thus less immunogenicity. Another method involves expressing viral antigens in cell lines engineered to have altered glycosylation enzymatic pathways.

Thus, cell lines and methods for producing glycan-modified glycoprotein antigens that can be used to develop broadly neutralizing antibodies against viruses and other pathogens are needed.

SUMMARY

To meet the above need, a method for producing a modified cell deficient in mannosyl (alpha-1,3-)-glycoprotein beta-1,2-N-acetylglucosaminyltransferase 1 ("MGAT1") activity is provided. The method introduces into a parent cell an RNA-guided endonuclease together with a guide RNA ("gRNA") that comprises a sequence as set forth in GGAUGCGCAGACCUGAGCAG (SEQ ID NO: 2), GGUAGUGGAGGACGAUCUGG (SEQ ID NO: 3), UUUCUCCACCUGUAGCAGGG (SEQ ID NO: 4), or GAUCGCCAGGCACUACCGCU (SEQ ID NO: 5); culturing the parent cell; isolating a plurality of daughter cells from the cell culture; and identifying a modified cell deficient in MGAT1 activity.

Within the scope of the invention is a CHO cell line deficient in MGAT1 activity produced by the above method.

An MGAT1-deficient CHO cell is also provided in which the cell contains in its genome a nucleic acid having a sequence as set forth in SEQ ID NO: 6

A first method is disclosed for producing a glycoprotein by obtaining an MGAT1-deficient cell produced using the above method; expressing in the cell a protein having an N-glycosylation site and culturing the cell, whereby the protein is N-glycosylated at the N-glycosylation site with an oligomannose glycan; and isolating the N-glycosylated protein from the cell.

Further disclosed is a second method for producing a glycoprotein by first producing an MGAT1-deficient cell using the above method; expressing in the cell a protein having an N-glycosylation site and culturing the cell, whereby the protein is N-glycosylated at the N-glycosylation site with an oligomannose glycan; and isolating the N-glycosylated protein from the cell.

Finally, a third method for producing a glycoprotein is disclosed which is carried out by obtaining the MGAT1-deficient CHO cell mentioned above that contains SEQ ID NO: 6; expressing in the cell a protein having an N-glycosylation site and culturing the cell line, whereby the protein is N-glycosylated at the N-glycosylation site with an oligomannose glycan; and isolating the N-glycosylated protein from the cell.

The details of one or more embodiments of the invention are set forth in the description below. Other features, objects, and advantages of the invention will be apparent from the description, the drawings, and the claims.

BRIEF DESCRIPTION OF THE DRAWINGS

FIG. 1 demonstrates a Western blot autoradiograph showing SARS-COV2spike proteins expressed in three different MGAT1-deficient CHO K1 cell lines and untreated (−) or treated (+) with endonuclease H ("EndoH").

FIG. 2A demonstrates a Western blot autoradiograph examining media collected from cultures of an MGAT1-deficient CHO K1 cell line expressing SARA-CoV2 spike proteins ("S protein") in comparison with standard proteins, including Sfg, Shm, and Smg. Sfg=fully glycosylated S protein, Shm=high mannose S protein, Smg=monoglycosylated S protein, A=medium from an adherent culture, and S=medium from a suspension culture.

FIG. 2B demonstrates a Western blot autoradiograph examining histidine-tagged S-proteins purified from a suspension culture of an MGAT1-deficient CHO K1 cell line and untreated (−) or treated (+) with EndoH in comparison with standard proteins, including Shm and Smg. Shm=high mannose S protein, Smg=monoglycosylated S protein.

FIG. 3A is a graphical presentation of the glycan composition of the 61-F.FSNVT.W fragment of the Delta His-tag-free SARS-COV2 spike protein expressed using an exemplary cell according to the present disclosure, treated or untreated with EndoH. The untreated fragment carried glycans including HexNAc (2) Hex (4), HexNAc (2) Hex (5), HexNAc (2) Hex (6), and HexNAc (2) Hex (7), or no glycan ("un"). The treated fragment either carried no glycan or only HexNAc (1). The solid rectangle represents NAc, and the solid circle represents mannose.

FIG. 3B is a graphical presentation of the glycan composition of the 74-F.HAIHVSGTNGTK.R fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (3), HexNAc (2) Hex (4), and HexNAc (2) Hex (5). The treated fragment carried only HexNAc (1). The solid rectangle represents NAc, and the solid circle represents mannose.

Figure 3A:
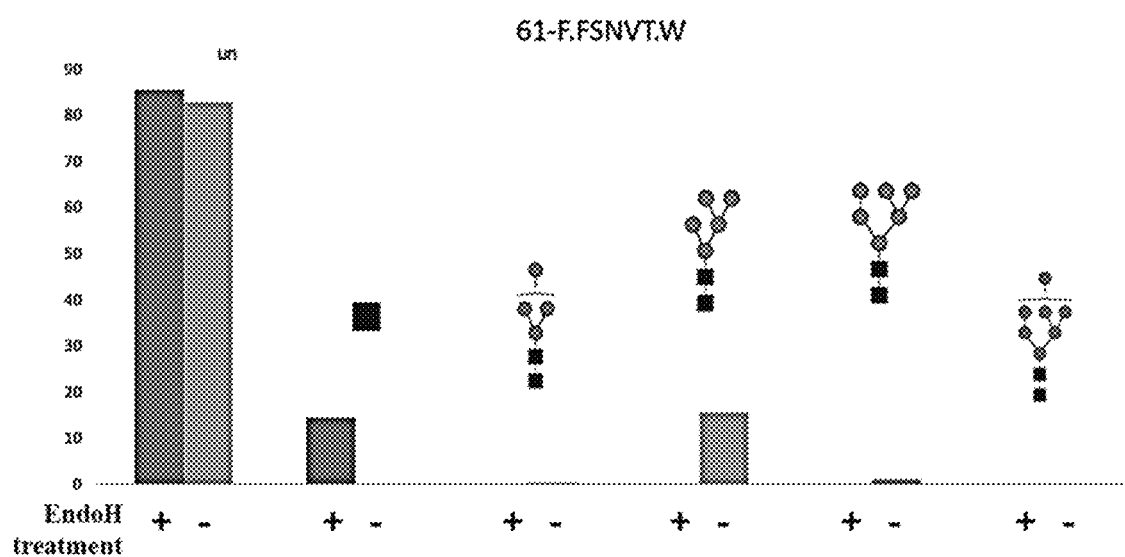
Figure 3B:
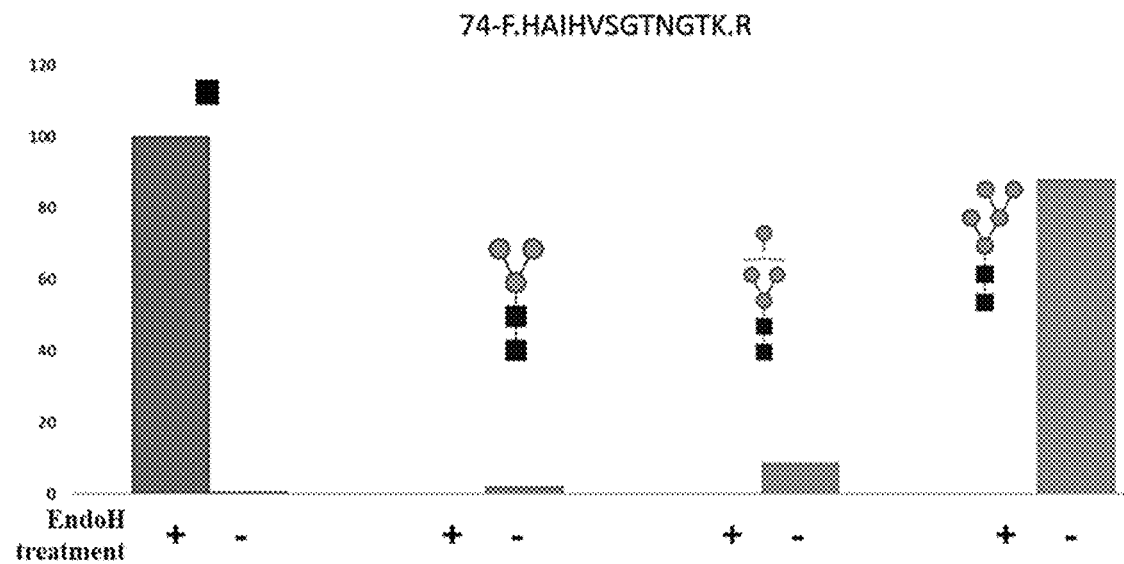
Figure 3C:
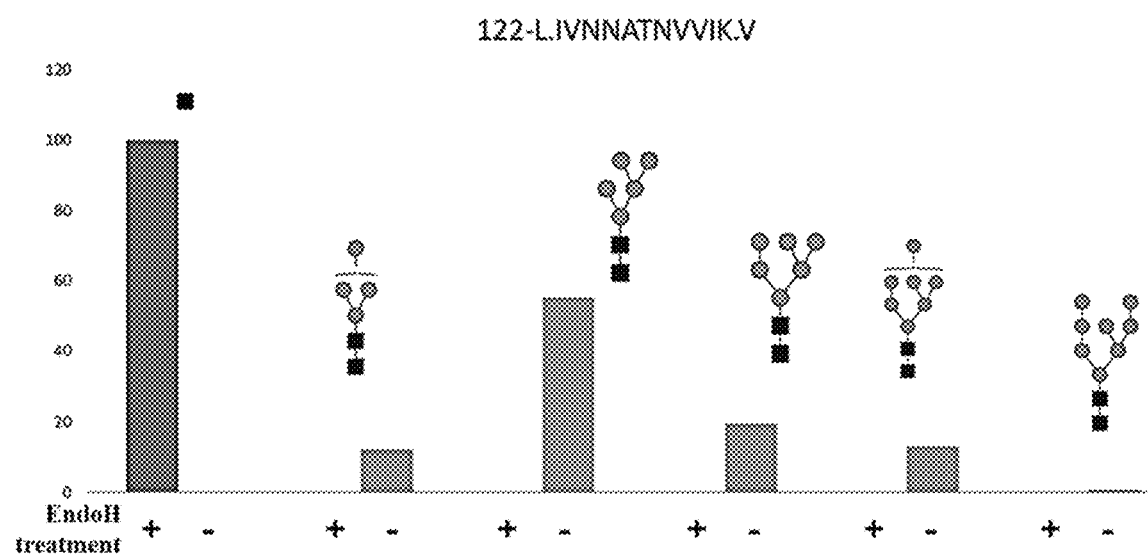

FIG. 3C is a graphical presentation of the glycan composition of the 122-L.IVNNATNVVIK. V fragment of the Delta His-tag-free SARS-COV2 spike protein expressed using an exemplary cell according to the present disclosure, treated or untreated with EndoH. The untreated fragment carried glycans, including HexNAc (2) Hex (4), HexNAc (2) Hex (5), HexNAc (2) Hex (6), HexNAc (2) Hex (7), and HexNAc (2) Hex (8). The treated fragment carried only HexNAc (1). The solid rectangle represents NAc, and the solid circle represents mannose.

Figure 3D:
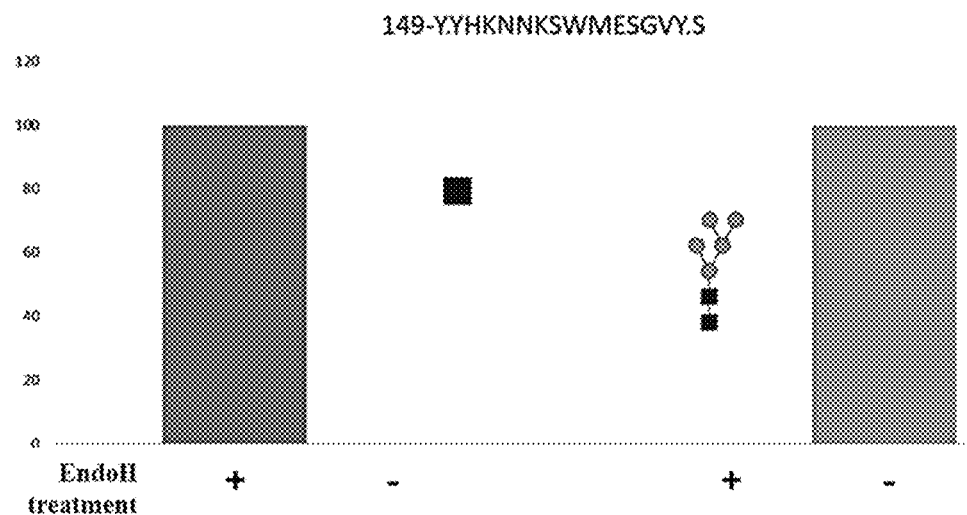

FIG. 3D is a graphical presentation of the glycan composition of the 149-Y.YHKNNKSWMESGVY.S fragment of the Delta His-tag-free SARS-COV2 spike protein expressed using an exemplary cell according to the present disclosure, treated or untreated with EndoH. The untreated fragment carried glycans, including HexNAc (2) Hex (5). The treated fragment carried only HexNAc (1). The solid rectangle represents NAc, and the solid circle represents mannose.

Figure 3E:
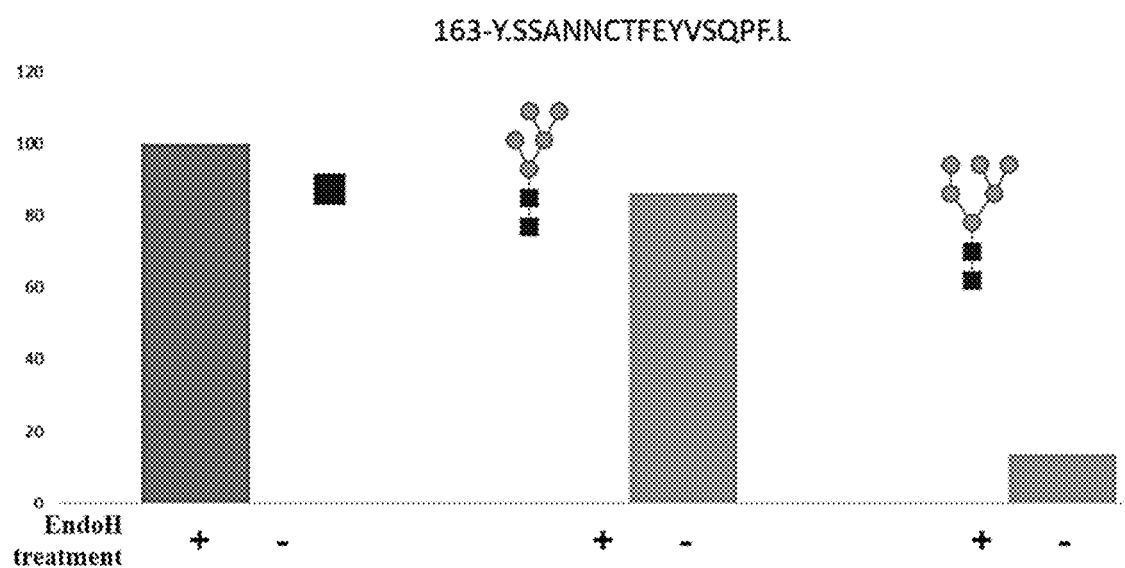

FIG. 3E is a graphical presentation of the glycan composition of the 163-Y.SSANNCTFEYVSQPF.L fragment of the Delta His-tag-free SARS-COV2 spike protein expressed using an exemplary cell according to the present disclosure, treated or untreated with EndoH. The untreated fragment carried glycans, including HexNAc (2) Hex (5) and HexNAc (2) Hex (6). The treated fragment carried only HexNAc (1). The solid rectangle represents NAc, and the solid circle represents mannose.

Figure 3F:
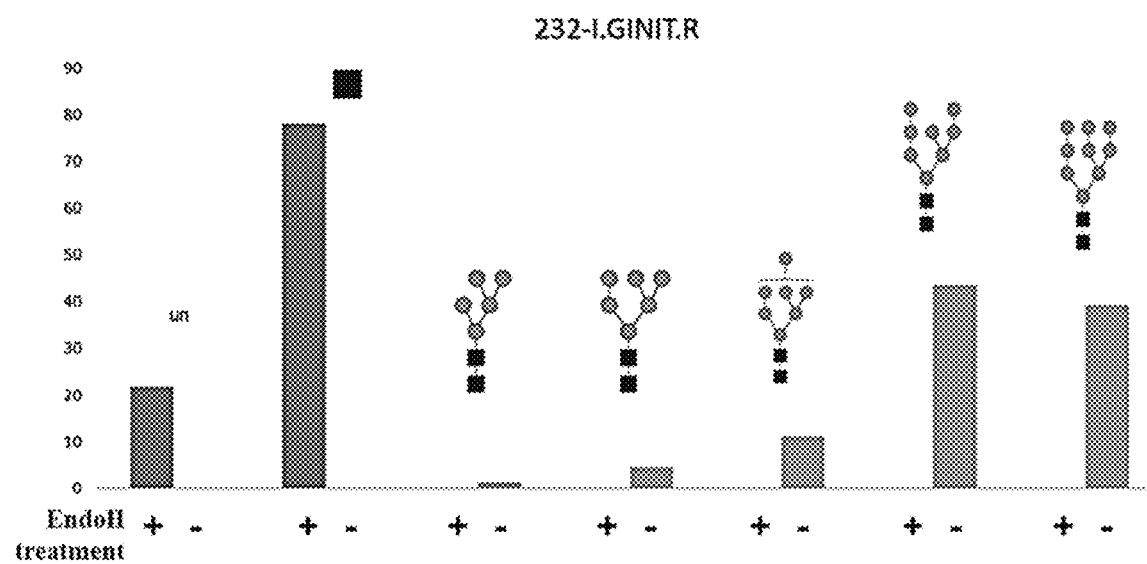

FIG. 3F is a graphical presentation of the glycan composition of the 232-I.GINIT.R fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (5), HexNAc (2) Hex (6), HexNAc (2) Hex (7), HexNAc (2) Hex (8), and HexNAc (2) Hex (9) or carried no glycan ("un"). The treated fragment either carried no glycan or only HexNAc (1). The solid rectangle represents NAc, and the solid circle represents mannose.

Figure 3G:
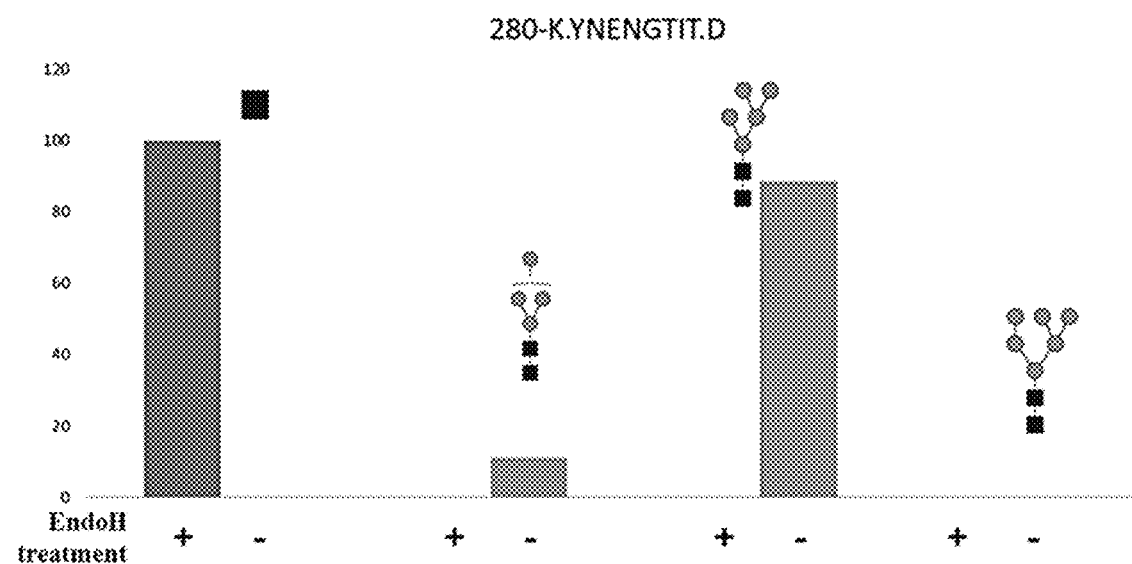

FIG. 3G is a graphical presentation of the glycan composition of the 280-K. YNENGTIT.D fragment of the Delta His-tag-free SARS-COV2 spike protein expressed using an exemplary cell according to the present disclosure, treated or untreated with EndoH. The untreated fragment carried glycans, including HexNAc (2) Hex (4), HexNAc (2) Hex (5), and HexNAc (2) Hex (6). The treated fragment carried only HexNAc (1). The solid rectangle represents NAc, and the solid circle represents mannose.

Figure 3H:
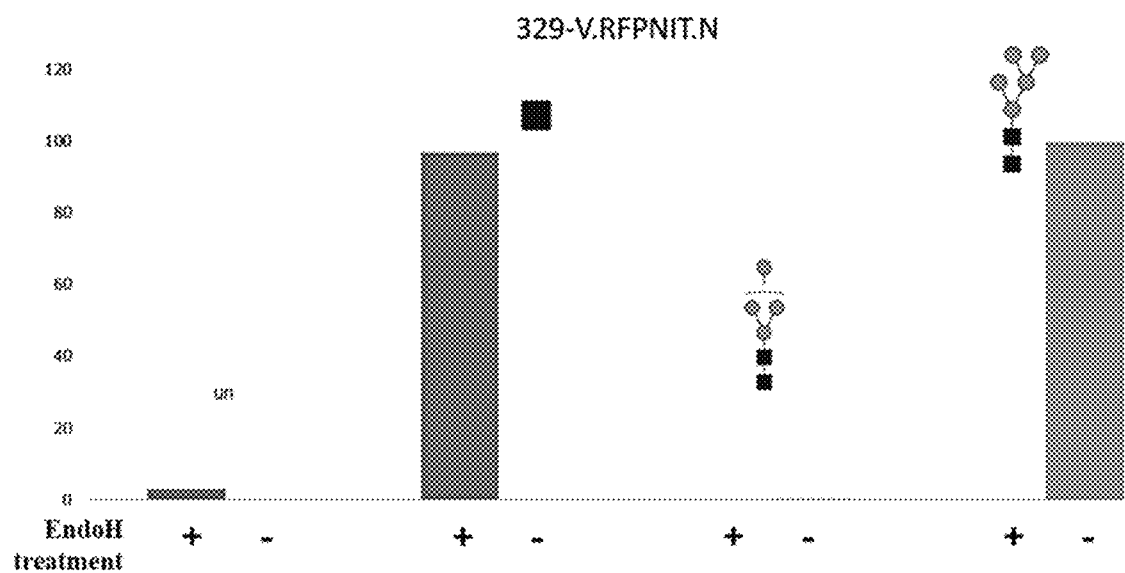

FIG. 3H is a graphical presentation of the glycan composition of the 329-V.RFPNIT.N fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5) or carried no glycan ("un"). The treated fragment carried no glycan or only HexNAc (1). The solid rectangle represents NAc, and the solid circle represents mannose.

Figure 3I:
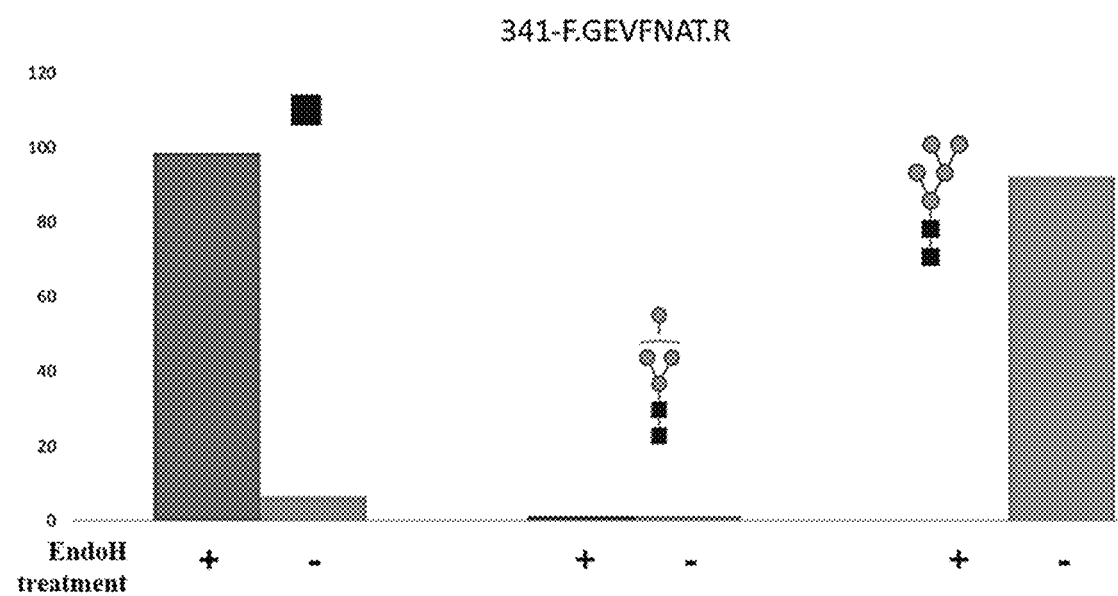

FIG. 3I is a graphical presentation of the glycan composition of the 341-F.GEVFNAT.R fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5). The treated fragment carried mainly HexNAc (1) and a small portion of HexNAc (2) Hex (4). The solid rectangle represents NAc, and the solid circle represents mannose.

Figure 3J:
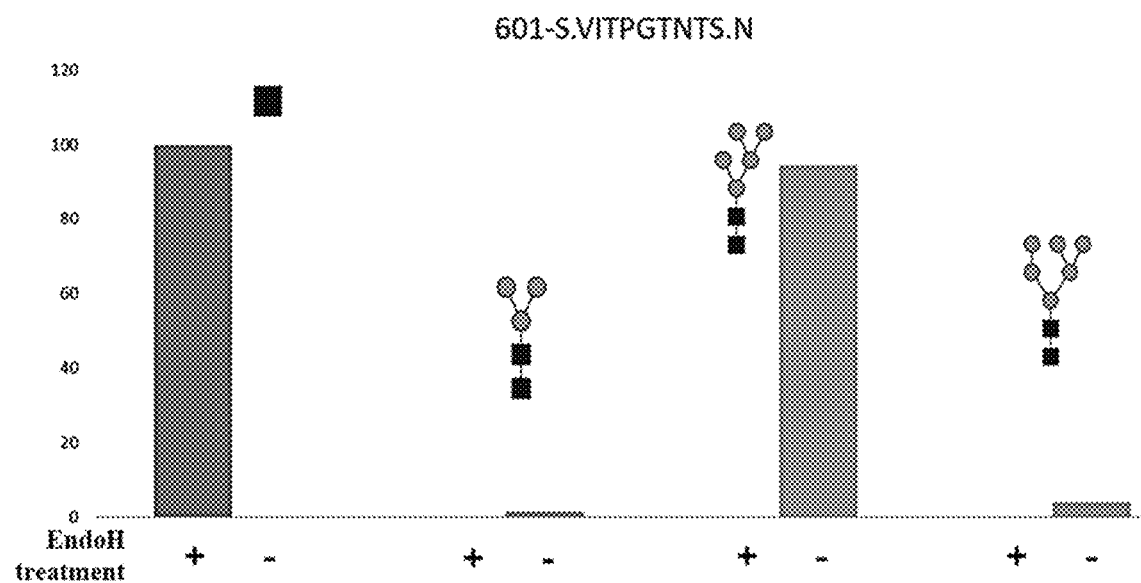

FIG. 3J is a graphical presentation of the glycan composition of the 601-S.VITPGTNTS.N fragment of the Delta His-tag-free SARS-COV2 spike protein expressed using an exemplary cell according to the present disclosure, treated or untreated with EndoH. The untreated fragment carried glycans, including HexNAc (2) Hex (3), HexNAc (2) Hex (5), and HexNAc (2) Hex (6). The treated fragment carried only HexNAc (1). The solid rectangle represents NAc, and the solid circle represents mannose.

Figure 3K:
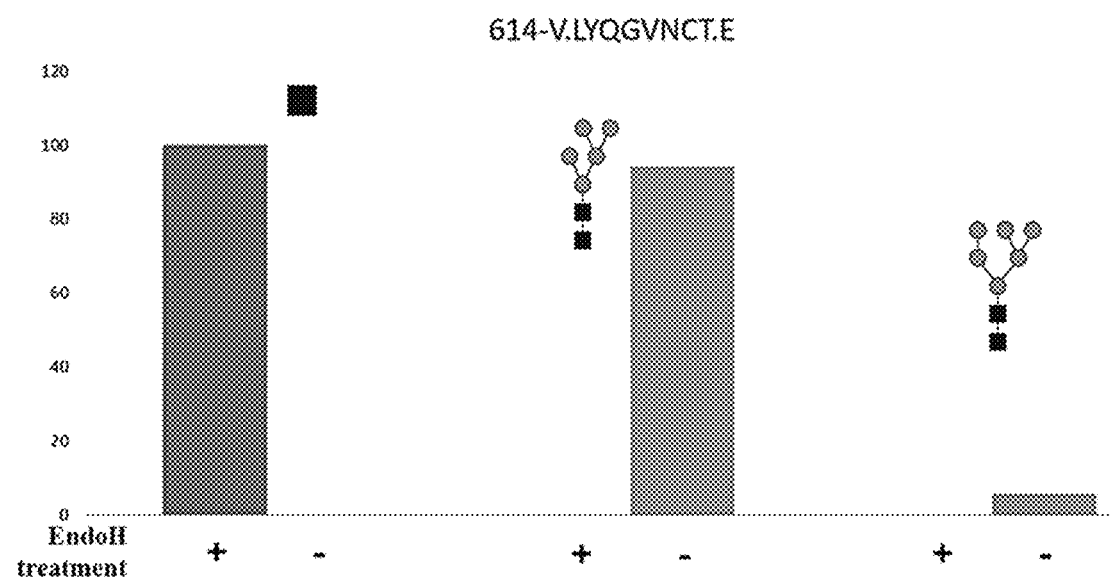

FIG. 3K is a graphical presentation of the glycan composition of the 614-V.LYQGVNCT.E fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (5), and HexNAc (2) Hex (6). The treated fragment carried mainly HexNAc (1). The solid rectangle represents NAc, and the solid circle represents mannose.

Figure 3L:
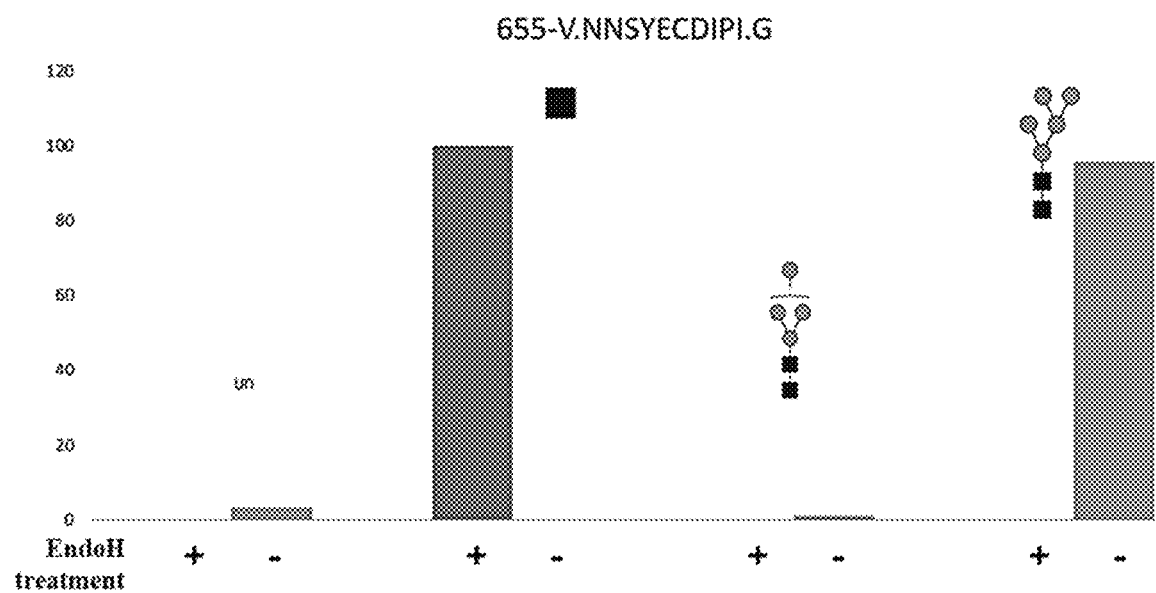

FIG. 3L is a graphical presentation of the glycan composition of the 655-V.NNSYECDIPI.G fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5) or carried no glycan ("un"). The treated fragment carried no glycan or only HexNAc (1). The solid rectangle represents NAc, and the solid circle represents mannose.

Figure 3M:
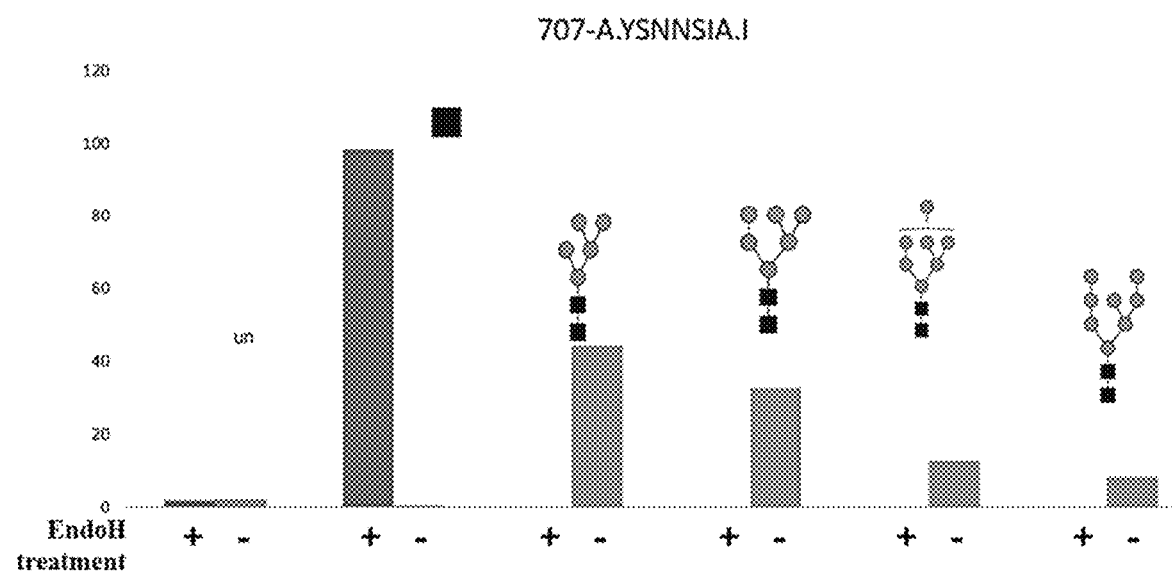

FIG. 3M is a graphical presentation of the glycan composition of the 707-A. YSNNSIA.I fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (5), HexNAc (2) Hex (6), HexNAc (2) Hex (7), and HexNAc (2) Hex (8) or carried no glycan ("un"). The treated fragment either carried no glycan or only HexNAc (1). The solid rectangle represents NAc, and the solid circle represents mannose.

Figure 3N:
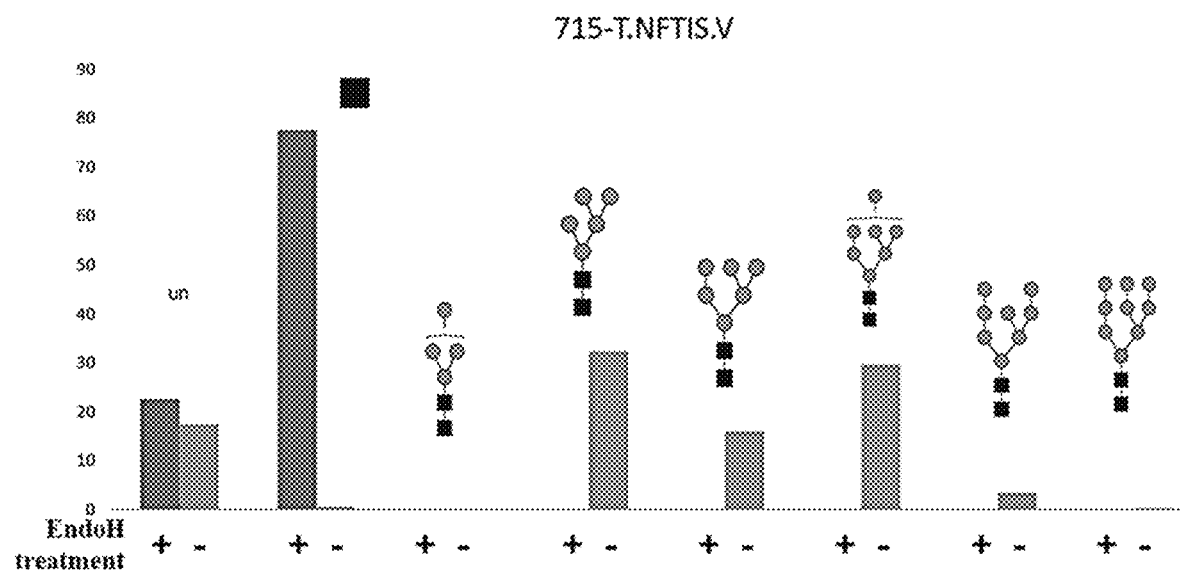

FIG. 3N is a graphical presentation of the glycan composition of the 715-T.NFTIS. V fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), HexNAc (2) Hex (5), HexNAc (2) Hex (6), HexNAc (2) Hex (7), HexNAc (2) Hex (8), and HexNAc (2) Hex (9) or carried no glycan ("un"). The treated fragment either carried no glycan or only HexNAc (1). The solid rectangle represents NAc, and the solid circle represents mannose.

Figure 3O:
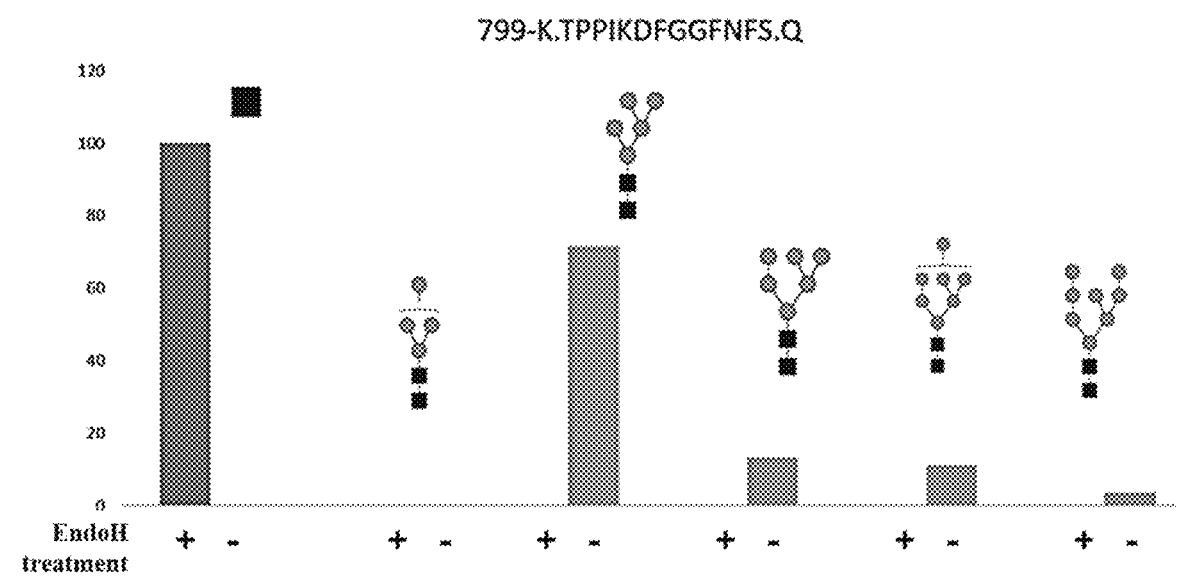

FIG. 3O is a graphical presentation of the glycan composition of the 799-K.TPPIKDFGGFNFS.Q fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), HexNAc (2) Hex (5), HexNAc (2) Hex (6), HexNAc (2) Hex (7), and HexNAc (2) Hex (8). The treated fragment carried only HexNAc (1). The solid rectangle represents NAc, and the solid circle represents mannose.

Figure 3P:
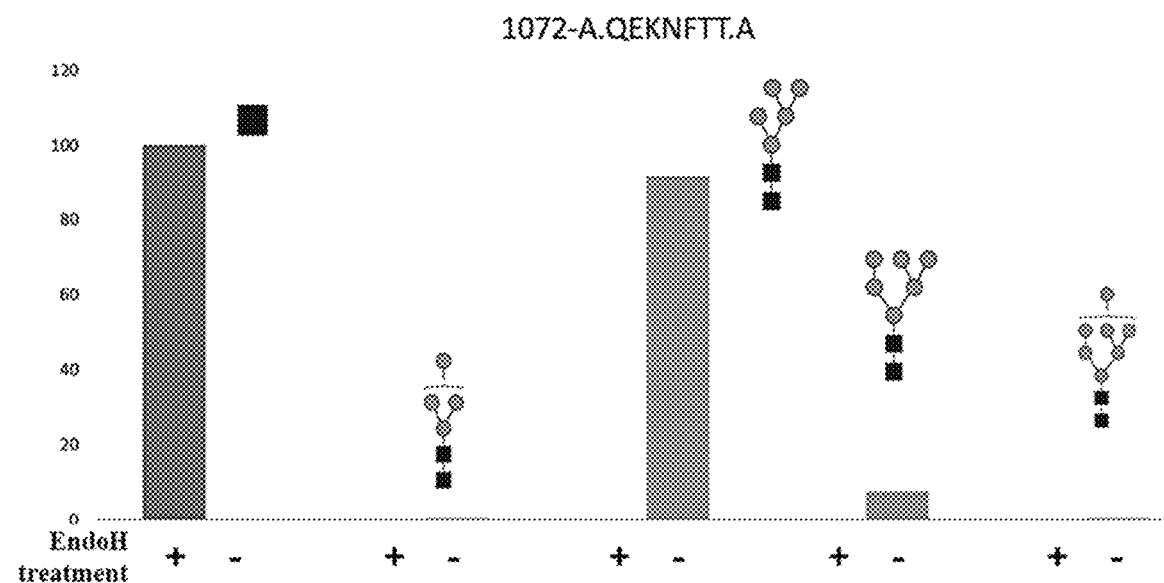

FIG. 3P is a graphical presentation of the glycan composition of the 1072-A.QEKNFTT.A fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), HexNAc (2) Hex (5), HexNAc (2) Hex (6), and HexNAc (2) Hex (7). The treated fragment carried only HexNAc (1). The solid rectangle represents NAc, and the solid circle represents mannose.

Figure 3Q:
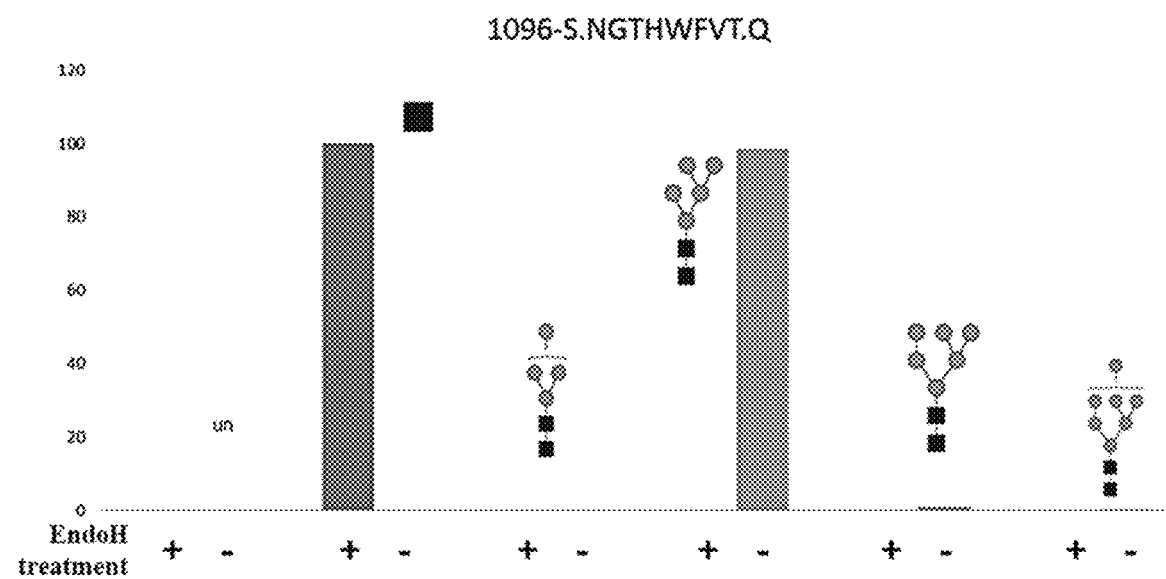

FIG. 3Q is a graphical presentation of the glycan composition of the 1096-S.NGTHWFVT.Q fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), HexNAc (2) Hex (5), HexNAc (2) Hex (6), and HexNAc (2) Hex (7) or carried no glycan ("un"). The treated fragment either carried no glycan or only HexNAc (1). The solid rectangle represents NAc, and the solid circle represents mannose.

Figure 3R:
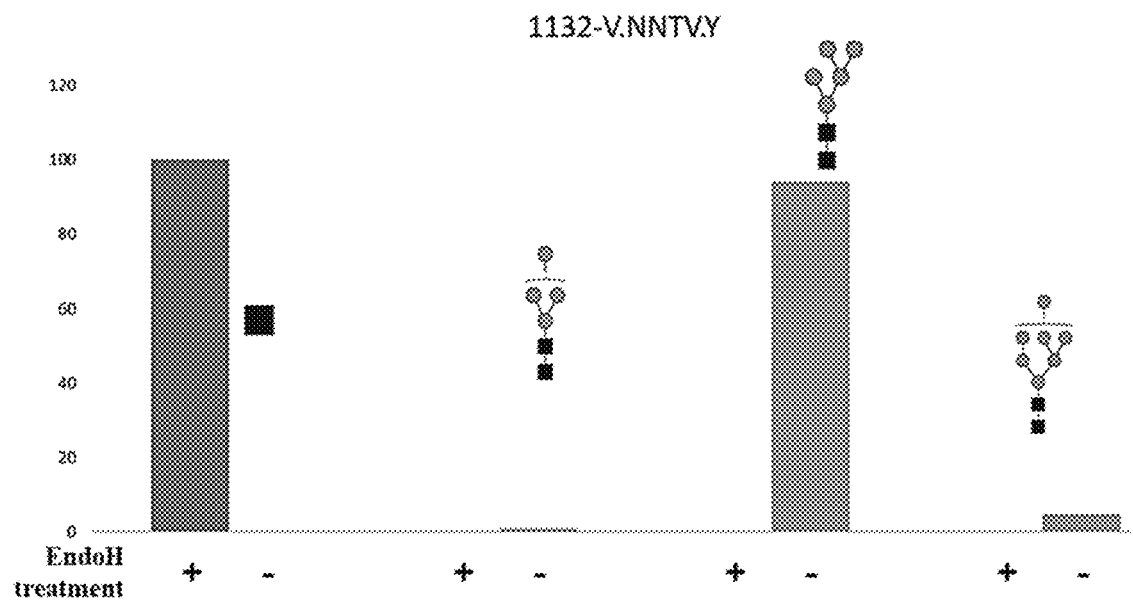

FIG. 3R is a graphical presentation of the glycan composition of the 1132-V.NNTV.Y fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), HexNAc (2) Hex (5), and HexNAc (2) Hex (7). The treated fragment carried only HexNAc (1). The solid rectangle represents NAc, and the solid circle represents mannose.

Figure 3S:
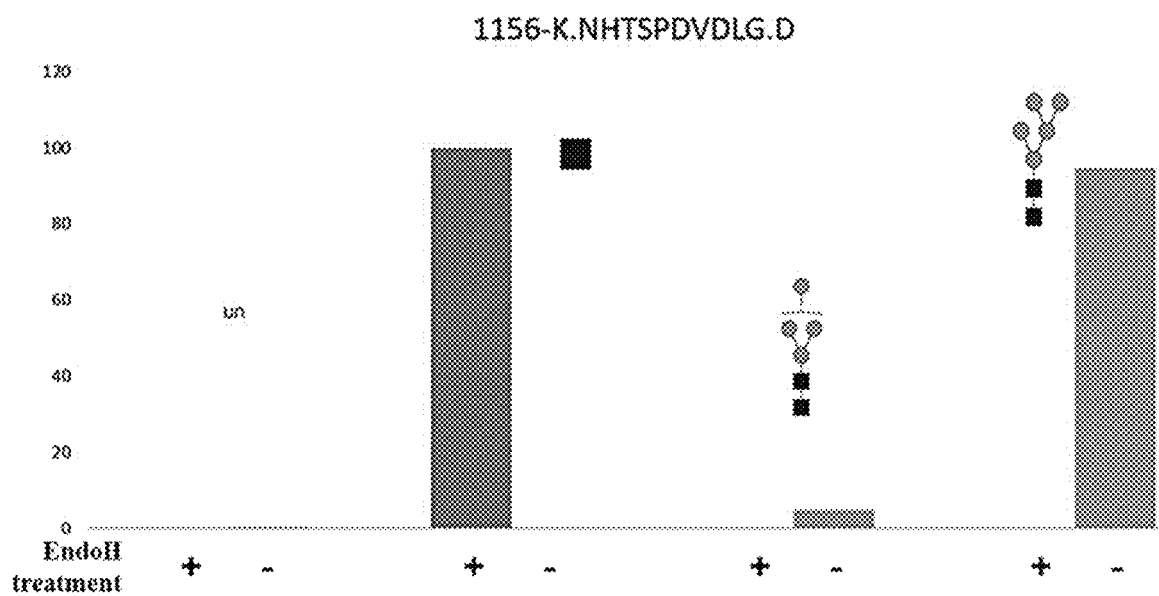

FIG. 3S is a graphical presentation of the glycan composition of the 1156-K.NHTSPDVDLG.D fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5) or carried no glycan ("un"). The treated fragment either carried no glycan or only HexNAc (1). The solid rectangle represents NAc, and the solid circle represents mannose.

Figure 3T:
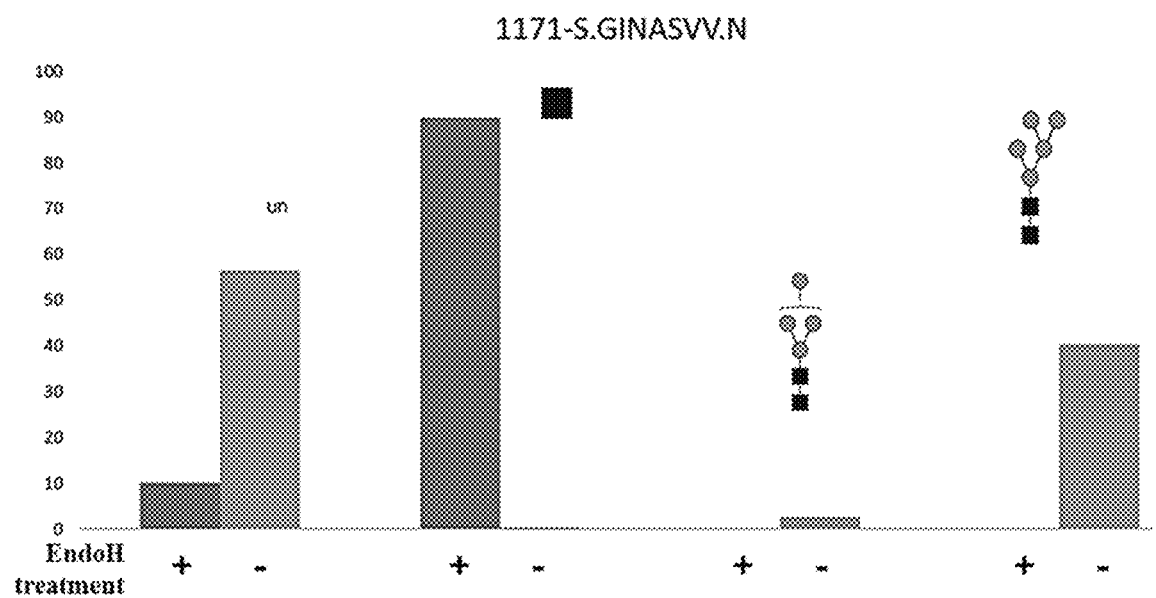

FIG. 3T is a graphical presentation of the glycan composition of the 1171-S.GINASVV.N fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5) or carried no glycan ("un"). The treated fragment either carried no glycan or only HexNAc (1). The solid rectangle represents NAc, and the solid circle represents mannose.

Figure 3U:
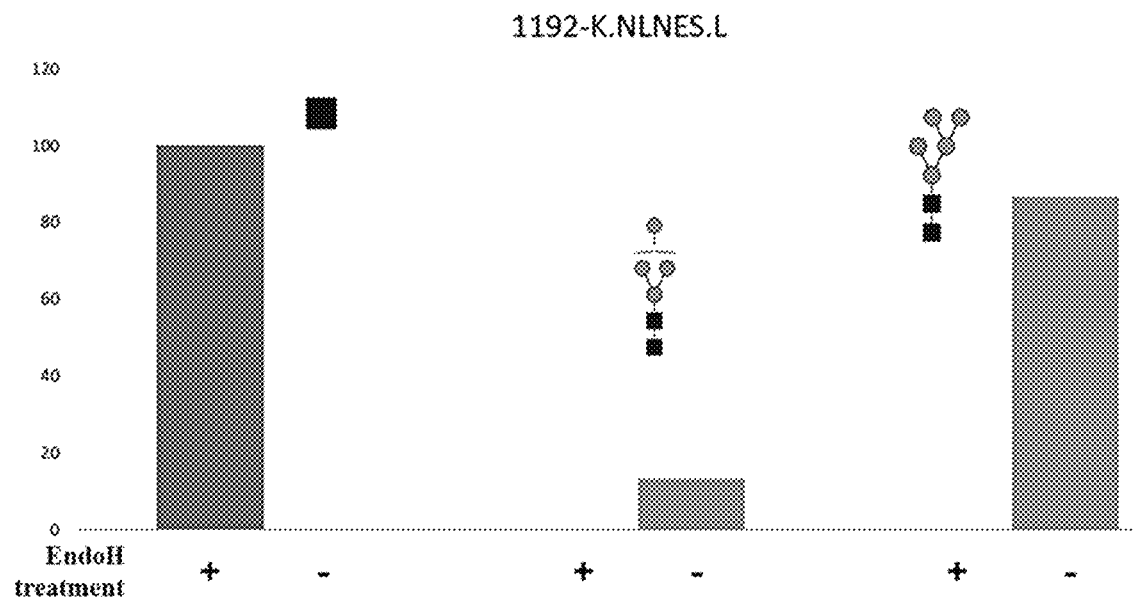

FIG. 3U is a graphical presentation of the glycan composition of the 655-V.NNSYECDIPI.G fragment of the Delta His-tag-free SARS-COV2 spike protein expressed using an exemplary cell according to the present disclosure, treated or untreated with EndoH. The untreated fragment carried glycans, including HexNAc (1), HexNAc (2) Hex (4), and HexNAc (2) Hex (5). The treated fragment carried only HexNAc (1). The solid rectangle represents NAc, and the solid circle represents mannose.

DETAILED DESCRIPTION

In one aspect, the present disclosure provides a method for producing a modified cell deficient in MGAT1 activity. The method comprises introducing into a parent cell, e.g., CHO K1, an RNA-guided endonuclease together with a guide RNA (gRNA).

As used herein, "MGAT1-deficient" or "deficient in MGAT1 activity" describes that the mannosyl (alpha-1,3-)-glycoprotein beta-1,2-N-acetylglucosaminyltransferase 1 of the cell does not function as compared to that of a wild-type or unmodified cell. The deficiency in MGAT-1 can be achieved by altering the MGAT-1 gene by inserting one or more nucleotides or deleting or replacing one or more nucleotides thereof, resulting in missense mutations, nonsense mutations, or frame-shift mutations of the gene. The altered gene might no longer be able to express a protein product or would express a nonfunctional protein product.

In some embodiments, the RNA-guided endonuclease is a clustered regularly interspaced short palindromic repeat-associated protein ("Cas") that can be *Streptococcus pyogenes* Cas9 ("SpCas9"), enhanced SpCas9 (eSpCas9), or SpCas9-high fidelity 1 (SpCas9-HF1). In certain embodiments, the RNA-guided endonuclease is SpCas9.

Without wishing to be bound by theories, in the embodiments that the RNA-guided endonuclease is a Cas protein, the introduced gRNA will bind the target gene at a location based on the hybridization between the gRNA and the target gene. The hybridization between the gRNA and the target gene recruits the Cas protein, thereby forming a complex that activates the Cas protein. The activated Cas protein cleaves the binding site and knocks out the fragment of the target gene, leaving a double-strand break (DSB). The DSB will then be repaired via the homology-directed repair (HDR) mechanism. The repaired gene, therefore, loses a fragment thereof and is no longer intact. The gene either cannot be expressed, or the expressed gene product thereof will lose its functions.

In some embodiments, the gRNA can include a nucleic acid sequence as set forth in SEQ ID NO: 2, SEQ ID NO: 3, SEQ ID NO: 4, or SEQ ID NO: 5. In certain embodiments, the gRNA comprises a nucleic acid sequence as set forth in SEQ ID NO: 3.

In some embodiments, the parent cell of the present disclosure comprises a gene, which encodes a protein exhibiting the MGAT1 activity. In the embodiments that the gRNA comprises a nucleic acid sequence as set forth in SEQ ID NO: 2, SEQ ID NO: 3, SEQ ID NO: 4, or SEQ ID NO: 5, the gene of the parent cell, which encodes a protein exhibiting the MGAT1 activity, comprises a target sequence, which is able to hybridize with at least a portion of the SEQ ID NO: 2, SEQ ID NO: 3, SEQ ID NO: 4, and SEQ ID NO: 5 respectively.

In some embodiments, the gRNA used in the method comprises a clustered regularly interspaced short palindromic repeat RNA ("crRNA") and a trans-activating crRNA ("tracrRNA"). The crRNA and the tracrRNA, in some embodiments, are coupled with each other via hybridization, while, in some other embodiments, the crRNA and the tracrRNA are formed into the same nucleic acid molecule. In certain embodiments, the tracrRNA comprises a nucleic acid sequence as set forth in SEQ ID NO: 11. Note that, in some embodiments, the crRNA includes a nucleic acid sequence as set forth in SEQ ID NO: 2, SEQ ID NO: 3, SEQ ID NO: 4, or SEQ ID NO: 5 and further comprises a region complementary to the 5' end of the tracrRNA. For example, a crRNA that includes SEQ ID NO: 3 is GGUAGUG-GAGGACGAUCUGGGUUUUAGAGCUAUGCU 3' (SEQ ID NO: 13). Exemplary crRNAs that include SEQ ID NOs: 2, 4, and 5 are GGAUGCGCAGACCUGAGCAG-GUUUUAGAGCUAUGCU (SEQ ID NO: 12), UUUCUC- CACCUGUAGCAGGGGUUUUAGAGCUAUGCU (SEQ ID NO: 14), and GAUCGCCAGGCACUACCGCGUUUUAGAGCUAUGCU (SEQ ID NO: 15), respectively.

In some embodiments, the RNA-guided endonuclease and the gRNA can be introduced into the parent cell, which can be a CHO cell, e.g., CHO K1, using electroporation as a pre-formed complex.

In some embodiments, the above method comprises identifying a modified cell deficient in MGAT1 activity. The identifying can be accomplished using an MGAT1 enzymatic activity assay or by sequencing a candidate cell's genomic DNA to identify those having an insertion and/or deletion that would result in loss of MGAT1 gene expression and/or loss in enzymatic activity of the MGAT1 gene product. For example, the identifying step can be carried out by performing a bacteriophage T7 Endonuclease I ("T7EI") digestion assay on genomic DNA fragments amplified from candidate cells and sequencing the genomic DNA fragments from T7EI digestion assay-positive cells. The T7EI digestion assay is known in the art to be an effective tool for identifying small sequence mismatches. For example, DNA fragments amplified from the cell's genome DNA can be denatured and re-annealed with wild-type DNA molecules. Then, the annealed DNA fragments are digested by T7 Endonuclease I, resulting in different sizes of digested DNA fragments if mismatches exist. However, the present disclosure is not limited to using the T7EI digestion assay.

In one aspect of the present disclosure, the modified cell described above can be used to produce a glycoprotein. The first method features expressing a glycoprotein having an N-glycosylation site in an MGAT1-deficient cell (which can be a modified CHO cell according to the present disclosure). In some embodiments, the method is performed in vitro. The glycoprotein can be expressed by suitable methods known in the art, e.g., transfection, retroviral transduction, and lentivirus transduction, into the modified cell of a vector that expresses the protein. The vector can be but is not limited to, a plasmid expression vector, a retroviral vector, and a lentiviral vector. When viral vectors are employed, the viral particles can be produced in an appropriate host cell known in the art.

Expressing the glycoprotein in the MGAT1-deficient cell results in N-glycosylation at the N-glycosylation site with an oligomannose glycan. The N-glycosylated protein, i.e., an oligomannose glycoprotein, is then isolated from the cell by standard procedures known in the art. For example, the N-glycosylated protein can be purified from culture supernatant. Alternatively, the cells can be collected by centrifugation, and the N-glycosylated protein can be purified from the cell pellets.

In some embodiments, the culture of MGAT1-deficient cells can be an adherent culture or a suspension culture.

The first method for producing a glycoprotein can also comprise removing the oligomannose glycan to leave only an N-acetylglucosamine residue at the N-glycosylation site, thereby producing a monoglycosylated protein. The oligomannose glycan can be removed by incubating the glycoprotein carrying the oligomannose glycan with a glycopeptide-D-mannosyl-N4-(N-acetyl-D-glucosaminyl) 2-asparagine 1,4-N-acetyl-beta-glucosaminohydrolase ("Endo H").

In some embodiments, the glycoprotein expressed in the MGAT1-deficient cell can be, e.g., a cellular protein or a viral envelope protein.

In certain embodiments, the glycoprotein is a viral envelope protein, e.g., SARS-COV2 spike protein, Pan-sarbecovirus spike protein, Pan-betacoronavirus spike protein, or Influenza hemagglutinin. The SARS-COV2 spike protein can be but is not limited to alpha-SARS-COV2, beta-SARS-COV2, gamma-SARS-COV2, delta-SARS-CoV2, omicron-SARS-COV2, or variants thereof.

In certain embodiments, the SARS-COV2 spike protein can comprise an amino acid sequence set forth in SEQ ID NO: 16 or SEQ ID NO: 17.

In other embodiments, the glycoprotein is a cellular protein such as alpha-fetoprotein, β-human chorionic gonadotropin, cancer antigens 15-3, 19-9, 27.29, 125, and 549, carcinoembryonic antigen, a carcinoembryonic antigen-related cell adhesion molecule, human epidermal growth factor receptor 2, oncofetal fibronectin, placental alkaline phosphatase, and prostate-specific antigen.

In one aspect of the present disclosure, two additional methods for producing a glycoprotein are provided. In some embodiments, these methods are performed in vitro.

The second exemplary method comprises the steps of the first method, except that the second method additionally comprises producing a modified cell deficient in MGAT1 activity.

The third exemplary method is a particular variation of the first method, in which the third method specifically employs an MGAT1-deficient cell comprising a nucleic acid in its genome, having a sequence as set forth in SEQ ID NO: 6.

The specific examples below are to be construed as merely illustrative and should not be construed as a limitation to the remainder of the disclosure in any way whatsoever. Without further elaboration, it is believed that one skilled in the art can, based on the description herein, utilize the present disclosure to its fullest extent. All publications cited herein are hereby incorporated by reference in their entirety.

EXAMPLES

Example 1: MGAT1 Gene Editing in CHO Cells

Exemplary adherent CHO K1 cells were cultured in Ham's F12 (Sigma) supplemented with 2 mM GLUTAMAX™ (GIBCO) and 10% fetal bovine serum ("FBS") at 37° C., 5% $CO_2$. For suspension cultures, exemplary CHO K1 cells were grown in BalanCD CHO Growth A Medium (FUJIFILM Irvine Scientific) supplemented with 8 mM GLUTAMAX™ and 0.5% Anti-Clumping Supplement (FUJIFILM Irvine Scientific), also at 37° C., 5% $CO_2$.

Example 2: Gene Editing

Gene editing of the MGAT1 gene in CHO K1 cells was performed using standard techniques. Briefly, ribonucleoprotein particles ("RNPs") were prepared in vitro by mixing recombinant Cas9, universal tracrRNA (SEQ ID NO: 11), and crRNAs comprising a sequence as set forth in SEQ ID NOs: 2, 3, 4, or 5. The mixture was incubated at 37° C. for 10 min. to form the RNPs.

The RNPs (5 microliters) containing 3.3 µM Cas9, 6.6 µM tracrRNA, and 6.6 µM of one of the four crRNAs were electroporated into $1.0 \times 10^5$ CHO K1 cells in 10 µL R buffer using the Neon system (Thermo Fisher) according to the manual. Following electroporation, cells were plated into a 24-well plate (2 mL per well) and cultured at 37° C., 5% $CO_2$ for three days.

Example 3: Detection of Gene-Edited Clones by T7EI assay

To examine the results of the gene-editing described in Example 2, electroporated cells were grown to reach a cell number of $1.0\times10^5$, harvested, lysed at 37° C. for 15 min. in 100 µL lysis buffer (10 mM Tris-HCl pH 8.0, 0.05% SDS, 250 µg/ml proteinase K), and heat-inactivated at 85° C. for 15 min.

The region of interest of the MGAT1 gene was amplified from a sample of the cell lysate by polymerase chain reaction ("PCR") using forward primer ACCCGT-GAGGTGTTCCGCCT (SEQ ID NO: 7) and reverse primer AGACACGGGCAAGGAAATCCC (SEQ ID NO: 8) to give a 943 bp product.

A T7 nuclease E1 digestion assay was performed on the PCR products according to the manufacturer's protocol (New England Biolabs: "NEB"). T7E1-treated samples were analyzed by agarose gel electrophoresis to identify cells carrying an insertion/deletion ("indel") in the MGAT1 gene region of interest.

Indel-positive cell clones were further analyzed by sequencing the 943 bp product after column purification using forward primer ACCCCCTCACCAGCCGTGAT (SEQ ID NO: 9) and reverse primer TCTGGACGAATA-CAGGCCCGC (SEQ ID NO: 10).

Cells were plated with serial dilutions to obtain clonal cell lines.

Example 4: Screening for MGAT1-CHO K1 Clonal Cell Lines

Loss of MGAT1 activity in CHO K1 clonal cell lines was evaluated by expressing SARS-COV2 spike glycoprotein in the cells. The expressed spike proteins were then incubated with EndoH to detect incompletely glycosylated high-mannose-modified spike protein. Glycoproteins were expressed in CHO K1 clonal cell lines using a lentivirus expression system as outlined below.

Lentivirus Production $1.7\times10^7$ 293T cells (ATCC CRL-3216) were added to a 15 cm plate. After culturing for 24 h, the cells were transfected with four plasmid vectors totaling 30 µg as follows: 10 µg of a plasmid that expresses the viral GAG, POL, and ENV genes and carries a REV response element, 2.5 µg of a plasmid expressing REV, 2.5 µg of a plasmid expressing VSV-G protein, and 15 µg of a plasmid carrying a histidine-tagged S protein coding sequence (the wide-type S protein sequence is as set forth in SEQ ID NO: 16) and lentivirus backbone. The plasmids were transfected into the 293T cells using Lipofectamine 3000 as directed by the supplier (Thermo Fisher). Following a 48 h incubation, cell supernatants were collected, passed through a 0.45 µm filter, and concentrated 100-fold with a Lenti-X concentrator (Takara) according to the manufacturer's protocol.

Spike Protein Production

Thirty microliters of the concentrated lentivirus were added to $2\times10^4$ candidate MGAT1-CHO-K1 clonal cells. After one round of single-cell limiting dilution, cells were further expanded until more than $1\times10^5$ cells were reached. Then, $1\times10^5$ cells were plated in a well of a 24-well plate with 0.5 mL culture medium and grown for 96 h. The supernatant from each well was collected and purified using a COVID-19 Spike Protein Affinity Resin (Repligen, SR-24156: NGL #22) according to the manual. Briefly, the collected supernatant was loaded to the column and chased for 10 mL with Buffer A (20 mM Tris-HCl, 140 mM NaCl, pH 7.5). The column was then washed for 8 CV with Buffer A and eluted for 7 CV with Buffer B (100 mM acetate, 1 M arginine, pH 5.5), followed by stripping the column for 4 CV with Buffer C (200 mM acetic acid). After that, the column was undergone a cleaning-in-place (CIP) process with Buffer D (0.1 N NaOH) for 4 CV. Then, the column was neutralized with Buffer A for 5 CV. After the purification, the collected supernatant was concentrated to a final volume of 20 µL.

EndoH Digestion and Western Blot

Ten microliters of each concentrated supernatant containing approximately 20 µg of protein were digested with 1 µg EndoH or mock digested for 2 h at 37° C. as directed by the manufacturer (NEB). MGAT1-cells produce high mannose glycoproteins that can be digested by EndoH and show fast mobility in acrylamide gel electrophoresis, i.e., a gel shift.

Following digestion, 16 µL of each sample was examined using Western blot analysis with the BOLT™ system (Thermo Fisher) with 8% Bis-Tris mini-protein gels as directed by the manufacturer.

After electrophoretic transfer from the gels to a PVDF membrane, S protein was detected using primary antibody mouse anti-SARS-COV2 (clone 1035206; R&D Systems) and secondary antibody horseradish peroxidase-conjugated goat anti-mouse Fc (Invitrogen) then visualized using Clarity Max Western ECL substrate (BioRad).

The results are shown in FIG. 1. All three candidate CHO K1 clonal cell lines showed a gel shift to lower molecular weight of the S protein after EndoH digestion, confirming the lack of MGAT1 activity in these cells.

One exemplary CHO K1 clonal cell line was selected for further assessment. The MGAT1 gene in this cell line has a two-nucleotide deletion at positions 640 and 641 of SEQ ID NO: 1 within the MGAT1 coding sequence. The two-base deletion causes a frameshift in the MGAT1 coding sequence. The DNA sequence comprising the deletion site is shown in SEQ ID NO: 6.

Example 5: Optimization of S Protein Expression

The CHO K1 clonal cell line was adapted to suspension culture using standard methods. An adherent culture of the clonal cell line was grown in a 24-well plate, and a suspension culture was grown in a T125 flask. Histidine-tagged S protein was expressed in both cell cultures using the method set forth above.

Figure 2A:
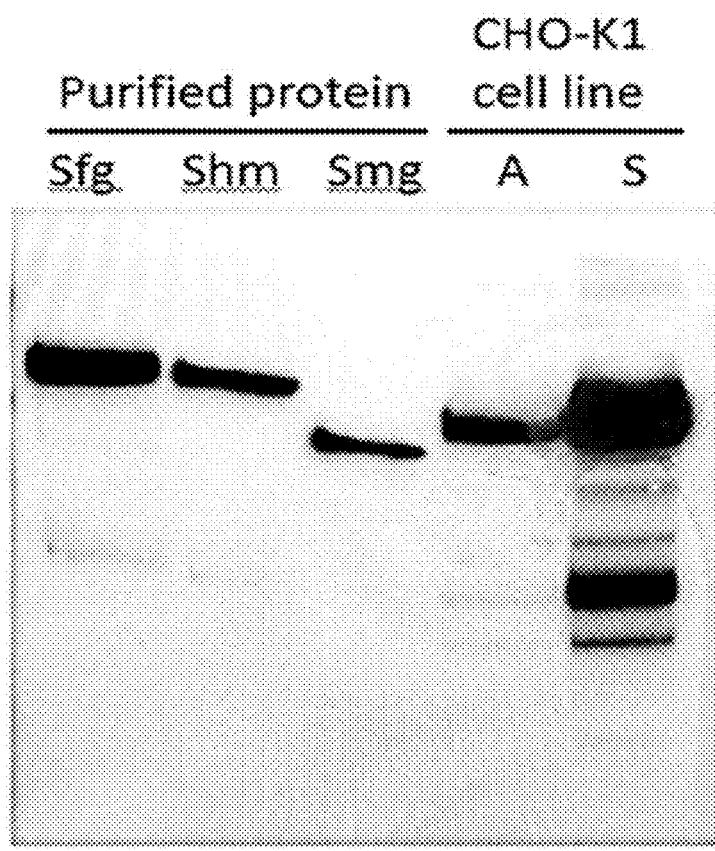

Cultured media was collected (0.5 mL from a well of the 24-well plate and 30 mL from the T125 flask), concentrated to 20 µL, and analyzed using Western blot as described above. The results are shown in FIG. 2A.

Standard S protein samples of full glycosylation (Sfg), high mannose glycosylation (Shm), and monoglycosylated (Smg) showed different mobility as expected. See FIG. 2, first three lanes.

Both adherent (A) and suspension(S) cultures of the CHO K1 clonal cell line expressed significant amounts of S protein after lentivirus infection. See FIG. 2A, last two lanes. The mobilities of the S proteins were consistent with the high mannose form, confirming that the CHO K1 cell line is MGAT1−.

Figure 2B:
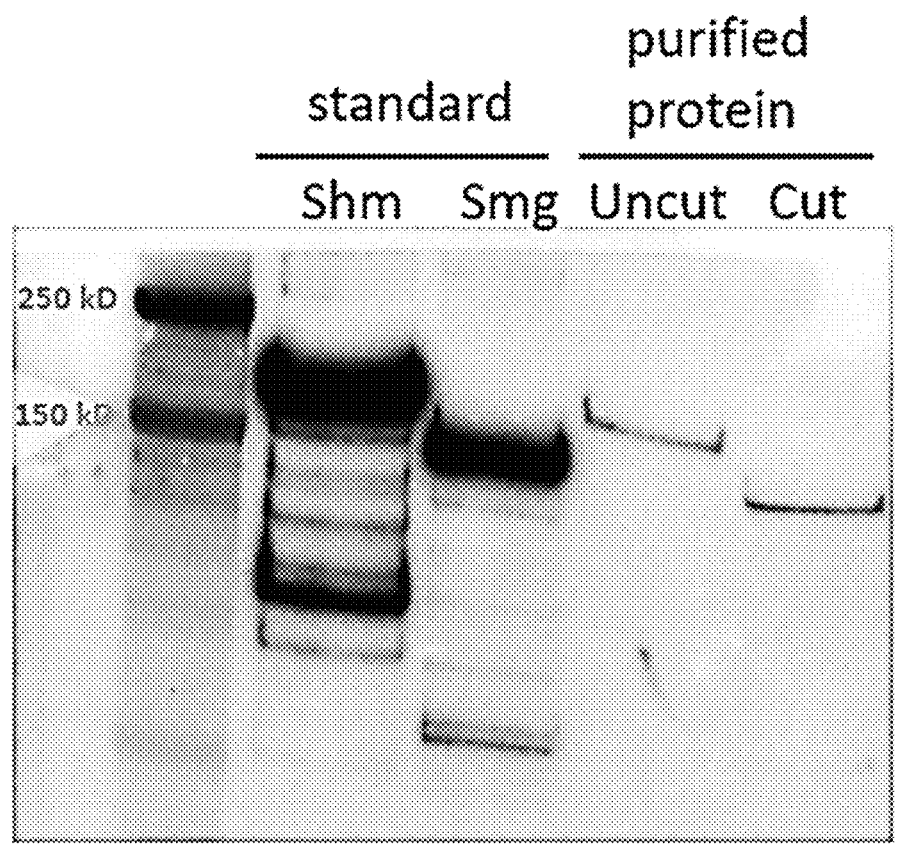

The histidine-tagged high-mannose S protein was purified from the suspension culture medium by nickel chelation using standard techniques, subjected to EndoH treatment as set forth in Example 4 above and analyzed using Western blot. The results are shown in FIG. 2B. The untreated S protein purified from the CHO K1 clonal cell line migrated at the same position, indicating a high-mannose S protein, while the EndoH-treated purified S protein migrated to the position corresponding to a monoglycosylated S protein.

Alternatively, the experiments described in Example 4 and Example 5 were repeated to express a His-tag-free SARS-COV2 spike protein (Delta strain). The expressed and purified S proteins were separated into 5 parts and respectively treated with chymotrypsin, chymotrypsin and trypsin, trypsin, αlytic protease and trypsin, and α-lytic protease. The treated samples were then vacuum-dried for MS analysis. The results show that the purity of the expressed spike protein samples was over 90%, and the protease digestion was efficient, with a digestion rate higher than 95%.

After the protease digestion, the spike proteins were cleaved into 17 peptide fragments comprising 21 N-glycosylation sites in total (the peptide comprising the N17 glycosylation site was not included). All 21 N-glycosylation sites were highly mannosylated (i.e., with high mannose contents), especially mannose-5 (Man5). The high mannose contents were further verified by using Endo H treatment as, after the treatment, only single GluNAcs were observed (FIGS. 3A to 3U).

Other Embodiments

Embodiment 1. A method for producing a modified cell deficient in mannosyl (alpha-1,3-)-glycoprotein beta-1,2-N-acetylglucosaminyltransferase (MGAT1) activity, the method comprising: introducing into a parent cell an RNA-guided endonuclease together with a guide RNA (gRNA) comprising a sequence as set forth in GGAUGCGCAGAC-CUGAGCAG (SEQ ID NO: 2), GGUAGUG-GAGGACGAUCUGG (SEQ ID NO: 3), UUUCUCCAC-CUGUAGCAGGG (SEQ ID NO: 4), or GAUCGCCAGGCACUACCGCU (SEQ ID NO: 5); culturing the parent cell and expanding the parent cell; isolating a plurality of daughter cells from the cell culture; identifying a modified cell deficient in MGAT1 activity; and isolating said modified cell deficient in MGAT1 activity.

Embodiment 2. The method of embodiment 1, wherein the identifying of a modified cell deficient in MGAT1 activity comprises: performing a bacteriophage T7 Endonuclease I (T7EI) digestion assay on genomic DNA fragments amplified from the plurality of daughter cells and sequencing the genomic DNA fragments from T7EI digestion assay-positive cells.

Embodiment 3. The method of embodiment 1 or embodiment 2, wherein the gRNA comprises a Clustered Regularly Interspaced Short Palindromic Repeat RNA (crRNA) and a trans-activating crRNA (tracrRNA), and the RNA-guided endonuclease is Cas9.

Embodiment 4. The method of any one of embodiments 1 to 3, wherein the method comprises: introducing into the cell an RNA-guided endonuclease together with a guide RNA (gRNA) using electroporation of a pre-formed complex of the RNA-guided endonuclease and the gRNA.

Embodiment 5. The method of any one of embodiments 1 to 4, wherein the parent cell is a CHO cell.

Embodiment 6. The method of embodiment 5, wherein the gRNA comprises a nucleic acid sequence as set forth in SEQ ID NO: 3.

Embodiment 7. A Chinese hamster ovary cell line produced according to the method of any one of embodiments 1 to 6.

Embodiment 8. The cell line of embodiment 7, wherein the cell line is derived from the CHO K1 cell line.

Embodiment 9. A method for producing a glycoprotein, the method comprising: obtaining a mannosyl (alpha-1,3-)-glycoprotein beta-1,2-N-acetylglucosaminyltransferase-deficient (MGAT1-deficient) cell produced according to the method of any one of embodiments 1 to 8; expressing in the MGAT1-deficient cell a protein having an N-glycosylation site, whereby the protein is N-glycosylated at the N-glycosylation site with an oligomannose glycan; and isolating the N-glycosylated protein from the cell.

Embodiment 10. The method of embodiment 9, further comprising incubating the glycosylated protein with glycopeptide-D-mannosyl-N4-(N-acetyl-D-glucosaminyl) 2-asparagine 1,4-N-acetyl-beta-glucosaminohydrolase (Endo H) to remove the oligomannose glycan, whereby an N-acetylglucosamine residue remains at the N-glycosylation site.

Embodiment 11. The method of embodiment 9 or embodiment 10, wherein the protein is a viral envelope protein.

Embodiment 12. The method of embodiment 11, wherein the protein is a viral envelope protein selected from the group consisting of SARS-COV2 spike protein, Pan-sarbecovirus spike protein, Pan-betacoronavirus spike protein, and Influenza hemagglutinin.

Embodiment 13. The method of embodiment 12, wherein the SARS-COV2 spike protein is an alpha-SARS-COV2 spike protein, beta-SARS-COV2 spike protein, gamma-SARS-COV2 spike protein, delta-SARS-COV2 spike protein, or omicron-SARS-CoV2 spike protein.

Embodiment 14. The method of embodiment 13, wherein the SARS-COV2 spike protein comprises an amino acid sequence as set forth in SEQ ID NO: 16 or SEQ ID NO: 17.

Embodiment 15. The method of embodiment 9 or embodiment 10, wherein the protein is selected from the group consisting of alpha-fetoprotein, β-human chorionic gonadotropin, cancer antigens 15-3, 19-9, 27.29, 125, and 549, carcinoembryonic antigen, a carcinoembryonic antigen-related cell adhesion molecule, human epidermal growth factor receptor 2, oncofetal fibronectin, placental alkaline phosphatase, and prostate-specific antigen.

Embodiment 16. A method for producing a glycoprotein, the method comprising: producing a mannosyl (alpha-1,3-)-glycoprotein beta-1,2-N-acetylglucosaminyltransferase-deficient (MGAT1-deficient) cell according to the method of any one of embodiments 1 to 15; expressing in the MGAT1-deficient cell a protein having an N-glycosylation site, whereby the protein is N-glycosylated at the N-glycosylation site with an oligomannose glycan; and isolating the N-glycosylated protein from the cell.

Embodiment 17. A Chinese hamster ovary cell line deficient in mannosyl (alpha-1,3-)-glycoprotein beta-1,2-N-acetylglucosaminyltransferase activity, the cell line comprising in its genome a nucleic acid having a sequence as set forth in SEQ ID NO: 6.

Embodiment 18. The cell line of embodiment 17, wherein the cell line is derived from the CHO K1 cell line.

Embodiment 19. A method for producing a glycoprotein, the method comprising: obtaining the mannosyl (alpha-1,3-)-glycoprotein beta-1,2-N-acetylglucosaminyltransferase-deficient Chinese Hamster Ovary cell line of embodiment 17 or embodiment 18; expressing in the cell line a protein having an N-glycosylation site, whereby the protein is N-glycosylated at the N-glycosylation site with an oligomannose glycan; and isolating the N-glycosylated protein from the cell line.

Embodiment 20. The method of embodiment 19, further comprising incubating the glycosylated protein with glycopeptide-D-mannosyl-N4-(N-acetyl-D-glucosaminyl) 2-asparagine 1,4-N-acetyl-beta-glucosaminohydrolase (Endo H) to remove the oligomannose glycan, whereby an N-acetyl-glucosamine residue remains at the N-glycosylation site.

Embodiment 21. The method of embodiment 19 or embodiment 20, wherein the protein is a viral envelope protein.

Embodiment 22. The method of embodiment 21, wherein the protein is a viral envelope protein selected from the group consisting of SARS-COV2 spike protein, Pan-sarbecovirus spike protein, Pan-betacoronavirus spike protein, and Influenza hemagglutinin.

Embodiment 23. The method of embodiment 22, wherein the SARS-COV2 spike protein is an alpha-SARS-COV2 spike protein, beta-SARS-COV2 spike protein, gamma-SARS-COV2 spike protein, delta-SARS-COV2 spike protein, or omicron-SARS-CoV2 spike protein.

Embodiment 24. The method of embodiment 23, wherein the SARS-COV2 spike protein comprises an amino acid sequence as set forth in SEQ ID NO: 16 or SEQ ID NO: 17.

Embodiment 25. The method of embodiment 19 or embodiment 20, wherein the protein is selected from the group consisting of alpha-fetoprotein, β-human chorionic gonadotropin, cancer antigens 15-3, 19-9, 27.29, 125, and 549, carcinoembryonic antigen, a carcinoembryonic antigen-related cell adhesion molecule, human epidermal growth factor receptor 2, oncofetal fibronectin, placental alkaline phosphatase, and prostate-specific antigen.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present disclosure and, without departing from the spirit and scope thereof, can make various changes and modifications to the invention to adapt it to various usages and conditions. Thus, other embodiments are also within the claims.

```
                              SEQUENCE LISTING

SEQ ID NO: 01      atgctgaaga agcagtctgc agggcttgtg ctttggggtg ctatcctctt tgtgggctgg
                   aatgccctgc tgctcctctt cttctggaca cgcccagccc ctggcaggcc cccctcagat
                   agtgctatcg atgatgaccc tgccagcctc acccgtgagg tgttccgcct ggctgaggac
                   gctgaggtgg agttggagcg gcagcggggg ctgttgcagc aaatcaggga gcatcatgct
                   ttgtggagac agaggtggaa agtgccacc gtggcccctc cagcctgcc ccgtgtgcct
                   gcgacccct caccagccgt gatccccatc ctggtcattg cctgtgaccg cagcactgtc
                   cggcgctgct tggataagtt gttgcactat cggccctcag ctgagcattt ccccatcatt
                   gtcagccagg actgcgggca cgaagagaca gcacaggtca ttgcttccta tggcagtgca
                   gtcacacaca tccggcagcc agacctgagt aacatcgctg tgcccccaga ccaccgcaag
                   ttccagggtt actacaagat cgccaggcac taccgctggg cactgggcca gatcttcaac
                   aagttcaagt tcccagcagc tgtggtagtg gaggacgatc tggaggtggc accagacttc
                   tttgagtact tccaggccac ctacccactg ctgagaacag acccctccct ttggtgtgtg
                   tctgcttgga atgacaatgg caaggagcag atggtagact caagcaaacc tgagctgctc
                   tatcgaacag acttttttcc tggccttggc tggctgctga tggctgagct gtggacagag
                   ctggagccca agtggcccaa ggccttctgg gatgactgga tgcgcagacc tgagcagcgg
                   aagggggcggg cctgtattcg tccagaaatt tcaagaacga tgacctttgg ccgtaagggt
                   gtgagccatg ggcagttctt tgatcagcat cttaagttca tcaagctgaa ccagcagttc
                   gtgtcttttca cccagttgga tttgtcatac ttgcagcggg aggcttatga ccgggatttc
                   cttgcccgtg tctatagtgc cccctgcta caggtggaga aagtgaggac caatgatcag
                   aaggagctgg gggaggtgcg ggtacagtac actagcagag acagcttcaa ggccttttgct
                   aaggccctgg gtgtcatgga tgacctcaag tctggtgtcc ccagagctgg ctaccggggc
                   gttgtcactt tccagttcag gggtcgacgt gtccacctgg cacccccaca aacctgggaa
                   ggctatgatc ctagctggaa ttag SEQ ID NO: 02      ggaugcgcag accugagcag SEQ ID NO: 03      gguaguggag gacgaucugg SEQ ID NO: 04      uuucuccacc uguagcaggg SEQ ID NO: 05      gaucgccagg cacuaccgcu SEQ ID NO: 06      agttcaagtt cccagcagct gtggtagtgg aggacgatgg aggggcacc agacttcttt gagt SEQ ID NO: 07      acccgtgagg tgttccgcct SEQ ID NO: 08      agacacgggc aaggaaatcc c SEQ ID NO: 09      accccctcac cagccgtgat SEQ ID NO: 10      tctggacgaa tacaggcccg c SEQ ID NO: 11      agcauagcaa guuaaaauaa ggcuaguccg uuaucaacuu gaaaaagugg
                   caccgagucg gygcuuu SEQ ID NO: 12      ggaugcgcag accugagcag guuuuagagc uaugcu SEQ ID NO: 13      gguaguggag gacgaucugg guuuuagagc uaugcu SEQ ID NO: 14      uuucuccacc uguagcaggg guuuuagagc uaugcu SEQ ID NO: 15      gaucgccagg cacuaccgcu guuuuagagc uaugcu
```

| | |
|---|---|
| SEQ ID NO: 16 | MFVFLVLLPLVSSQCVNLTTRTQLPPAYTNSFTRGVYYPDKVFRS |
| | SVLHSTQDLFLPFFSNVTWFHAIHVSGTNGTKRFDNPVLPFNDGV |
| | YFASTEKSNIIRGWIFGTTLDSKTQSLLIVNNATNVVIKVCEFQFC |
| | NDPFLGVYYHKNNKSWMESEFRVYSSANNCTFEYVSQPFLMDL |
| Spike protein of WT Strain (Wuhan strain) | EGKQGNFKNLREFVFKNIDGYFKIYSKHTPINLVRDLPQGFSALE |
| | PLVDLPIGINITRFQTLLALHRSYLTPGDSSSGWTAGAAAYYVGY |
| | LQPRTFLLKYNENGTITDAVDCALDPLSETKCTLKSFTVEKGIYQ |
| | TSNFRVQPTESIVRFPNITNLCPFGEVFNATRFASVYAWNRKRISN |
| | CVADYSVLYNSASFSTFKCYGVSPTKLNDLCFTNVYADSFVIRG |
| | DEVRQIAPGQTGKIADYNYKLPDDFTGCVIAWNSNNLDSKVGG |
| | NYNYLYRLFRKSNLKPFERDISTEIYQAGSTPCNGVEGFNCYFPL |
| | QSYGFQPTNGVGYQPYRVVVLSFELLHAPATVCGPKKSTNLVK |
| | NKCVNFNFNGLTGTGVLTESNKKFLPFQQFGRDIADTTDAVRDP |
| | QTLEILDITPCSFGGVSVITPGTNTSNQVAVLYQDVNCTEVPVAIH |
| | ADQLTPTWRVYSTGSNVFQTRAGCLIGAEHVNNSYECDIPIGAGI |
| | CASYQTQTNSPRRARSVASQSIIAYTMSLGAENSVAYSNNSIAIPT |
| | NFTISVTTEILPVSMTKTSVDCTMYICGDSTECSNLLLQYGSFCTQ |
| | LNRALTGIAVEQDKNTQEVFAQVKQIYKTPPIKDFGGFNFSQILP |
| | DPSKPSKRSFIEDLLFNKVTLADAGFIKQYGDCLGDIAARDLICA |
| | QKFNGLTVLPPLLTDEMIAQYTSALLAGTITSGWTFGAGAALQIP |
| | FAMQMAYRFNGIGVTQNVLYENQKLIANQFNSAIGKIQDSLSST |
| | ASALGKLQDVVNQNAQALNTLVKQLSSNFGAISSVLNDILSRLD |
| | KVEAEVQIDRLITGRLQSLQTYVTQQLIRAAEIRASANLAATKMS |
| | ECVLGQSKRVDFCGKGYHLMSFPQSAPHGVVFLHVTYVPAQEK |
| | NFTTAPAICHDGKAHFPREGVFVSNGTHWFVTQRNFYEPQIITTD |
| | NTFVSGNCDVVIGIVNNTVYDPLQPELDSFKEELDKYFKNHTSPD |
| | VDLGDISGINASVVNIQKEIDRLNEVAKNLNESLIDLQELGKYEQ |
| | YIKWPWYIWLGFIAGLIAIVMVTIMLCCMTSCCSCLKGCCSCGSC |
| | CKFDEDDSEPVLKGVKLHYT |
| SEQ ID NO: 17 Spike protein of Delta strain | MFVFLVLLPL VSSQCVNLRT RTQLPPAYTN SFTRGVYYPD |
| | KVFRSSVLHS TQDLFLPFFS NVTWFHAIHV SGTNGTKRFD |
| | NPVLPFNDGV YFASIEKSNI IRGWIFGTTL DSKTQSLLIV |
| | NNATNVVIKV CEFQFCNDPF LDVYYHKNNK SWMESGVYSS |
| | ANNCTFEYVS QPFLMDLEGK QGNFKNLREF VFKNIDGYFK |
| | IYSKHTPINL VRDLPQGFSA LEPLVDLPIG INITRFQTLL |
| | ALHRSYLTPG DSSSGWTAGA AAYYVGYLQP RTFLLKYNEN |
| | GTITDAVDCA LDPLSETKCT LKSFTVEKGI YQTSNFRVQP |
| | TESIVRFPNI TNLCPFGEVF NATRFASVYA WNRKRISNCV |
| | ADYSVLYNSA SFSTFKCYGV SPTKLNDLCF TNVYADSFVI |
| | RGDEVRQIAP GQTGKIADYN YKLPDDFIGC VIAWNSNNLD |
| | SKVGGNYNYR YRLFRKSNLK PFERDISTEI YQAGSKPCNG |
| | VEGFNCYFPL QSYGFQPTNG VGYQPYRVVV LSFELLHAPA |
| | TVCGPKKSTN LVKNKCVNFN FNGLTGTGVL TESNKKFLPF |
| | QQFGRDIADT TDAVRDPQTL EILDITPCSF GGVSVITPGT |
| | NTSNQVAVLY QGVNCTEVPV AIHADQLTPT WRVYSTGSNV |
| | FQTRAGCLIG AEHVNNSYEC DIPIGAGICA SYQTQTNSRG |
| | SAGSVASQSI IAYTMSLGAE NSVAYSNNSI AIPTNFTISV |
| | TTEILPVSMT KTSVDCTMYI CGDSTECSNL LLQYGSFCTQ |
| | LNRALTGIAV EQDKNTQEVF AQVKQIYKTP PIKDFGGFNF |
| | SQILPDPSKP SKRSFIEDLL FNKVTLADAG FIKQYGDCLG |
| | DIAARDLICA QKFNGLTVLP PLLTDEMIAQ YTSALLAGTI |
| | TSGWTFGAGA ALQIPFAMQM AYRENGIGVT QNVLYENQKL |
| | IANQFNSAIG KIQDSLSSTA SALGKLQNVV NQNAQALNTL |
| | VKQLSSNFGA ISSVLNDILS RLDPPEAEVQ IDRLITGRLQ |
| | SLQTYVTQQL IRAAEIRASA NLAATKMSEC VLGQSKRVDF |
| | CGKGYHLMSF PQSAPHGVVF LHVTYVPAQE KNFTTAPAIC |
| | HDGKAHFPRE GVFVSNGTHW FVTQRNFYEP QIITTDNTFV |
| | SGNCDVVIGI VNNTVYDPLQ PELDSFKEEL DKYFKNHTSP |
| | DVDLGDISGI NASVVNIQKE IDRLNEVAKN LNESLIDLQE |
| | LGKYEQYIKW PLVPRGSPGS GYIPEAPRDG QAYVRKDGEW |
| | VLLSTFLG |

What is claimed is:

1. A method for producing a glycoprotein, the method comprising:
obtaining a mannosyl (alpha-1,3-)-glycoprotein beta-1,2-N-acetylglucosaminyltransferase-deficient (MGAT1-deficient) cell, wherein the MGAT1-deficient cell comprises in its genome SEQ ID NO: 6 and is produced by a method comprising:
introducing into a parent cell an RNA-guided endonuclease together with a guide RNA (gRNA) comprising a sequence as set forth in

GGAUGCGCAGACCUGAGCAG, (SEQ ID NO: 2)

GGUAGUGGAGGACGAUCUGG, (SEQ ID NO: 3)

UUUCUCCACCUGUAGCAGGG, or (SEQ ID NO: 4)

GAUCGCCAGGCACUACCGCU; (SEQ ID NO: 5)

culturing the parent cell and expanding the parent cell;
isolating a plurality of daughter cells from the cell culture;
identifying a modified cell deficient in MGAT1 activity; and
isolating said modified cell deficient in MGAT1 activity;
expressing in the MGAT1-deficient cell a protein having an N-glycosylation site, whereby the protein is an Nonglycosylated protein that is N-glycosylated at the N-glycosylation site with an oligomannose glycan; and
isolating the N-glycosylated protein from the cell.

2. The method of claim 1, further comprising incubating the N-glycosylated protein with glycopeptide-D-mannosyl-N4-(N-acetyl-D-glucosaminyl) 2-asparagine 1,4-N-acetyl-beta-glucosaminohydrolase (Endo H) to remove the oligomannose glycan, whereby an N-acetylglucosamine residue remains at the N-glycosylation site.

3. The method of claim 1, wherein the protein is a viral envelope protein selected from the group consisting of SARS-COV2 spike protein, Pan-sarbecovirus spike protein, Pan-betacoronavirus spike protein, and Influenza hemagglutinin.

4. The method of claim 3, wherein the SARS-COV2 spike protein comprises an amino acid sequence as set forth in SEQ ID NO: 16 or SEQ ID NO: 17.

5. The method of claim 1, wherein the protein is selected from the group consisting of alpha-fetoprotein, β-human chorionic gonadotropin, cancer antigens 15-3, 19-9, 27.29, 125, and 549, carcinoembryonic antigen, a carcinoembryonic antigen-related cell adhesion molecule, human epidermal growth factor receptor 2, oncofetal fibronectin, placental alkaline phosphatase, and prostate-specific antigen.

6. A method for producing a glycoprotein, the method comprising:
obtaining a mannosyl (alpha-1,3-)-glycoprotein beta-1,2-N-acetylglucosaminyltransferase-deficient Chinese Hamster Ovary cell line, wherein the cell line comprises in its genome SEQ ID NO: 6;
expressing in the cell line a protein having an N-glycosylation site, whereby the protein is an N-glycosylated protein that is N-glycosylated at the N-glycosylation site with an oligomannose glycan; and
isolating the N-glycosylated protein from the cell line.

7. The method of claim 6, further comprising incubating the N-glycosylated protein with glycopeptide-D-mannosyl-N4-(N-acetyl-D-glucosaminyl) 2-asparagine 1,4-N-acetyl-beta-glucosaminohydrolase (Endo H) to remove the oligomannose glycan, whereby an N-acetylglucosamine residue remains at the N-glycosylation site.

8. The method of claim 6, wherein the protein is a viral envelope protein, selected from the group consisting of SARS-COV2 spike protein, Pan-sarbecovirus spike protein, Pan-betacoronavirus spike protein, and Influenza hemagglutinin.

9. The method of claim 8, wherein the SARS-COV2 spike protein comprises an amino acid sequence as set forth in SEQ ID NO: 16 or SEQ ID NO: 17.

10. The method of claim 6, wherein the protein is selected from the group consisting of alpha-fetoprotein, β-human chorionic gonadotropin, cancer antigens 15-3, 19-9, 27.29, 125, and 549, carcinoembryonic antigen, a carcinoembryonic antigen-related cell adhesion molecule, human epidermal growth factor receptor 2, oncofetal fibronectin, placental alkaline phosphatase, and prostate-specific antigen.

\* \* \* \* \*

SEQUENCE LISTING

```
Sequence total quantity: 17
SEQ ID NO: 1           moltype = DNA   length = 1344
FEATURE                Location/Qualifiers
source                 1..1344
                       mol_type = other DNA
                       organism = synthetic construct
SEQUENCE: 1
```

-continued

```
atgctgaaga agcagtctgc agggcttgtg ctttggggtg ctatcctctt tgtgggctgg    60
aatgccctgc tgctcctctt ctttctggaca cgcccagccc ctggcaggcc ccctcagat    120
agtgctatcg atgatgaccc tgccagcctc acccgtgagg tgttccgcct ggctgaggac    180
gctgaggtgg agttggagcg gcagcggggg ctgttgcagc aaatcaggga gcatcatgct    240
ttgtggagac agaggtggaa agtgcccacc gtggcccctc cagcctggcc ccgtgtgcct    300
gcgacccct caccagccgt gatccccatc ctggtcattg cctgtgaccg cagcactgtc    360
cggcgctgct tggataagtt gttgcactat cggccctcag ctgagcattt ccccatcatt    420
gtcagccagg actgcgggca cgaagagaca gcacaggtca ttgcttccta tggcagtgca    480
gtcacacaca tccggcagcc agacctgagt aacatcgctg tgcccccaga ccaccgcaag    540
ttccagggtt actacaagat cgccaggcac taccgctggg cactgggcca gatcttcaac    600
aagttcaagt tccagcagcc tgtggtagtg gaggacgatc tggaggtggc accagacttc    660
tttgagtact tccaggccac ctacccactg ctgagaacag acccctcct ttggtgtgtg    720
tctgcttgga atgacaatgg caaggagcag atggtagact caagcaaacc tgagctgctc    780
tatcgaacag actttttcc tggccttggc tggctgctga tggctgagct gtggacagag    840
ctggagccca gtggcccaa ggccttctgg gatgactgga tgcgcagacc tgagcagcgg    900
aaggggcggg cctgtattcg tccagaaatt tcaagaacga tgacctttgg ccgtaagggg    960
gtgagccatg ggcagttctt tgatcagcat cttaagttca tcaagctgaa ccagcagttc    1020
gtgtctttca cccagttgga tttgtcatac ttgcagcggg aggcttatga aggcgatttc    1080
cttgcccgtg tctatagtgc ccccctgcta caggtggaga aagtgaggac caatgatcag    1140
aaggagctgg gggaggtgcg ggtacagtac actagcagag acagcttcaa ggcctttgct    1200
aaggccctgg gtgtcatgga tgacctcaag tctggtgtcc ccagagctgg ctaccggggc    1260
gttgtcactt tccagttcag gggtcgacgt gtccacctgg caccccaca aacctgggaa    1320
ggctatgatc ctagctggaa ttag                                           1344
```

```
SEQ ID NO: 2           moltype = RNA   length = 20
FEATURE                Location/Qualifiers
source                 1..20
                       mol_type = other RNA
                       organism = synthetic construct
SEQUENCE: 2
ggatgcgcag acctgagcag                                                20

SEQ ID NO: 3           moltype = RNA   length = 20
FEATURE                Location/Qualifiers
source                 1..20
                       mol_type = other RNA
                       organism = synthetic construct
SEQUENCE: 3
ggtagtggag gacgatctgg                                                20

SEQ ID NO: 4           moltype = RNA   length = 20
FEATURE                Location/Qualifiers
source                 1..20
                       mol_type = other RNA
                       organism = synthetic construct
SEQUENCE: 4
tttctccacc tgtagcaggg                                                20

SEQ ID NO: 5           moltype = RNA   length = 20
FEATURE                Location/Qualifiers
source                 1..20
                       mol_type = other RNA
                       organism = synthetic construct
SEQUENCE: 5
gatcgccagg cactaccgct                                                20

SEQ ID NO: 6           moltype = DNA   length = 64
FEATURE                Location/Qualifiers
source                 1..64
                       mol_type = other DNA
                       organism = synthetic construct
SEQUENCE: 6
agttcaagtt cccagcagct gtggtagtgg aggacgatgg aggtggcacc agacttcttt    60
gagt                                                                 64

SEQ ID NO: 7           moltype = DNA   length = 20
FEATURE                Location/Qualifiers
source                 1..20
                       mol_type = other DNA
                       organism = synthetic construct
SEQUENCE: 7
acccgtgagg tgttccgcct                                                20

SEQ ID NO: 8           moltype = DNA   length = 21
FEATURE                Location/Qualifiers
source                 1..21
                       mol_type = other DNA
                       organism = synthetic construct
SEQUENCE: 8
```

```
agacacgggc aaggaaatcc c                                               21

SEQ ID NO: 9            moltype = DNA   length = 20
FEATURE                 Location/Qualifiers
source                  1..20
                        mol_type = other DNA
                        organism = synthetic construct
SEQUENCE: 9
acccccctcac cagccgtgat                                                20

SEQ ID NO: 10           moltype = DNA   length = 21
FEATURE                 Location/Qualifiers
source                  1..21
                        mol_type = other DNA
                        organism = synthetic construct
SEQUENCE: 10
tctggacgaa tacaggcccg c                                               21

SEQ ID NO: 11           moltype = RNA   length = 67
FEATURE                 Location/Qualifiers
source                  1..67
                        mol_type = other RNA
                        organism = synthetic construct
SEQUENCE: 11
agcatagcaa gttaaaataa ggctagtccg ttatcaactt gaaaaagtgg caccgagtcg     60
gygcttt                                                               67

SEQ ID NO: 12           moltype = RNA   length = 36
FEATURE                 Location/Qualifiers
source                  1..36
                        mol_type = other RNA
                        organism = synthetic construct
SEQUENCE: 12
ggatgcgcag acctgagcag gttttagagc tatgct                               36

SEQ ID NO: 13           moltype = RNA   length = 36
FEATURE                 Location/Qualifiers
source                  1..36
                        mol_type = other RNA
                        organism = synthetic construct
SEQUENCE: 13
ggtagtggag gacgatctgg gttttagagc tatgct                               36

SEQ ID NO: 14           moltype = RNA   length = 36
FEATURE                 Location/Qualifiers
source                  1..36
                        mol_type = other RNA
                        organism = synthetic construct
SEQUENCE: 14
tttctccacc tgtagcaggg gttttagagc tatgct                               36

SEQ ID NO: 15           moltype = RNA   length = 36
FEATURE                 Location/Qualifiers
source                  1..36
                        mol_type = other RNA
                        organism = synthetic construct
SEQUENCE: 15
gatcgccagg cactaccgct gttttagagc tatgct                               36

SEQ ID NO: 16           moltype = AA    length = 1273
FEATURE                 Location/Qualifiers
source                  1..1273
                        mol_type = protein
                        organism = synthetic construct
SEQUENCE: 16
MFVFLVLLPL VSSQCVNLTT RTQLPPAYTN SFTRGVYYPD KVFRSSVLHS TQDLFLPFFS     60
NVTWFHAIHV SGTNGTKRFD NPVLPFNDGV YFASTEKSNI IRGWIFGTTL DSKTQSLLIV    120
NNATNVVIKV CEFQFCNDPF LGVYYHKNNK SWMESEFRVY SSANNCTFEY VSQPFLMDLE    180
GKQGNFKNLR EFVFKNIDGY FKIYSKHTPI NLVRDLPQGF SALEPLVDLP IGINITRFQT    240
LLALHRSYLT PGDSSSGWTA GAAAYYVGYL QPRTFLLKYN ENGTITDAVD CALDPLSETK    300
CTLKSFTVEK GIYQTSNFRV QPTESIVRFP NITNLCPFGE VFNATRFASV YAWNRKRISN    360
CVADYSVLYN SASFSTFKCY GVSPTKLNDL CFTNVYADSF VIRGDEVRQI APGQTGKIAD    420
YNYKLPDDFT GCVIAWNSNN LDSKVGGNYN YLYRLFRKSN LKPFERDIST EIYQAGSTPC    480
NGVEGFNCYF PLQSYGFQPT NGVGYQPYRV VVLSFELLHA PATVCGPKKS TNLVKNKCVN    540
FNFNGLTGTG VLTESNKKFL PFQQFGRDIA DTTDAVRDPQ TLEILDITPC SFGGVSVITP    600
GTNTSNQVAV LYQDVNCTEV PVAIHADQLT PTWRVYSTGS NVFQTRAGCL IGAEHVNNSY    660
ECDIPIGAGI CASYQTQTNS PRRARSVASQ SIIAYTMSLG AENSVAYSNN SIAIPTNFTI    720
SVTTEILPVS MTKTSVDCTM YICGDSTECS NLLLQYGSFC TQLNRALTGI AVEQDKNTQE    780
VFAQVKQIYK TPPIKDFGGF NFSQILPDPS KPSKRSFIED LLFNKVTLAD AGFIKQYGDC    840
```

-continued

```
LGDIAARDLI CAQKFNGLTV LPPLLTDEMI AQYTSALLAG TITSGWTFGA GAALQIPFAM    900
QMAYRFNGIG VTQNVLYENQ KLIANQFNSA IGKIQDSLSS TASALGKLQD VVNQNAQALN    960
TLVKQLSSNF GAISSVLNDI LSRLDKVEAE VQIDRLITGR LQSLQTYVTQ QLIRAAEIRA   1020
SANLAATKMS ECVLGQSKRV DFCGKGYHLM SFPQSAPHGV VFLHVTYVPA QEKNFTTAPA   1080
ICHDGKAHFP REGVFVSNGT HWFVTQRNFY EPQIITTDNT FVSGNCDVVI GIVNNTVYDP   1140
LQPELDSFKE ELDKYFKNHT SPDVDLGDIS GINASVVNIQ KEIDRLNEVA KNLNESLIDL   1200
QELGKYEQYI KWPWYIWLGF IAGLIAIVMV TIMLCCMTSC CSCLKGCCSC GSCCKFDEDD   1260
SEPVLKGVKL HYT                                                     1273

SEQ ID NO: 17          moltype = AA  length = 1248
FEATURE                Location/Qualifiers
source                 1..1248
                       mol_type = protein
                       organism = synthetic construct
SEQUENCE: 17
MFVFLVLLPL VSSQCVNLRT RTQLPPAYTN SFTRGVYYPD KVFRSSVLHS TQDLFLPFFS    60
NVTWFHAIHV SGTNGTKRFD NPVLPFNDGV YFASIEKSNI IRGWIFGTTL DSKTQSLLIV   120
NNATNVVIKV CEFQFCNDPF LDVYYHKNNK SWMESGVYSS ANNCTFEYVS QPFLMDLEGK   180
QGNFKNLREF VFKNIDGYFK IYSKHTPINL VRDLPQGFSA LEPLVDLPIG INITRFQTLL   240
ALHRSYLTPG DSSSGWTAGA AAYYVGYLQP RTFLLKYNEN GTITDAVDCA LDPLSETKCT   300
LKSFTVEKGI YQTSNFRVQP TESIVRFPNI TNLCPFGEVF NATRFASVYA WNRKRISNCV   360
ADYSVLYNSA SFSTFKCYGV SPTKLNDLCF TNVYADSFVI RGDEVRQIAP GQTGKIADYN   420
YKLPDDFTGC VIAWNSNNLD SKVGGNYNYR YRLFRKSNLK PFERDISTEI YQAGSKPCNG   480
VEGFNCYFPL QSYGFQPTNG VGYQPYRVVV LSFELLHAPA TVCGPKKSTN LVKNKCVNFN   540
FNGLTGTGVL TESNKKFLPF QQFGRDIADT TDAVRDPQTL EILDITPCSF GGVSVITPGT   600
NTSNQVAVLY QGVNCTEVPV AIHADQLTPT WRVYSTGSNV FQTRAGCLIG AEHVNNSYEC   660
DIPIGAGICA SYQTQTNSRG SAGSVASQSI IAYTMSLGAE NSVAYSNNSI AIPTNFTISV   720
TTEILPVSMT KTSVDCTMYI CGDSTECSNL LLQYGSFCTQ LNRALTGIAV EQDKNTQEVF   780
AQVKQIYKTP PIKDFGGFNF SQILPDPSKP SKRSFIEDLL FNKVTLADAG FIKQYGDCLG   840
DIAARDLICA QKFNGLTVLP PLLTDEMIAQ YTSALLAGTI TSGWTFGAGA ALQIPFAMQM   900
AYRFNGIGVT QNVLYENQKL IANQFNSAIG KIQDSLSSTA SALGKLQNVV NQNAQALNTL   960
VKQLSSNFGA ISSVLNDILS RLDPPEAEVQ IDRLITGRLQ SLQTYVTQQL IRAAEIRASA  1020
NLAATKMSEC VLGQSKRVDF CGKGYHLMSF PQSAPHGVVF LHVTYVPAQE KNFTTAPAIC  1080
HDGKAHFPRE GVFVSNGTHW FVTQRNFYEP QIITTDNTFV SGNCDVVIGI VNNTVYDPLQ  1140
PELDSFKEEL DKYFKNHTSP DVDLGDISGI NASVVNIQKE IDRLNEVAKN LNESLIDLQE  1200
LGKYEQYIKW PLVPRGSPGS GYIPEAPRDG QAYVRKDGEW VLLSTFLG              1248
```